(12) United States Patent
Okabe et al.

(10) Patent No.: US 6,921,560 B2
(45) Date of Patent: Jul. 26, 2005

(54) LIQUID CRYSTAL COMPOSITION AND LIQUID CRYSTAL DISPLAY ELEMENT

(75) Inventors: Eiji Okabe, Ichihara (JP); Yoshitaka Tomi, Ichihara (JP); Masayuki Saito, Ichihara (JP); Hitoshi Yamamoto, Ichihara (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 0 days.

(21) Appl. No.: 10/769,795

(22) Filed: Feb. 3, 2004

(65) Prior Publication Data

US 2004/0155223 A1 Aug. 12, 2004

(30) Foreign Application Priority Data

Feb. 3, 2003 (JP) ........................................ 2003-025844
Dec. 22, 2003 (JP) ........................................ 2003-424375

(51) Int. Cl.$^7$ .......................... C09K 19/30; C09K 19/12; C09K 19/20
(52) U.S. Cl. ............... 428/1.1; 252/299.63; 252/299.66; 252/299.67
(58) Field of Search ...................... 428/1.1; 252/299.63, 252/299.66, 299.67

(56) References Cited

U.S. PATENT DOCUMENTS

| 5,032,312 A | 7/1991 | Kelly | 252/299.63 |
| 5,204,018 A | 4/1993 | Kelly | 252/299.63 |

FOREIGN PATENT DOCUMENTS

| JP | 3-66632 | 3/1991 |

OTHER PUBLICATIONS

Caplus 1991: 571442.*

* cited by examiner

Primary Examiner—Shean C. Wu
(74) Attorney, Agent, or Firm—Wenderoth, Lind & Ponack, L.L.P.

(57) ABSTRACT

A liquid crystal composition having a negative dielectric anisotropy, containing at least one compound selected from the group of compounds represented by Formulas (1-1), (1-2), (1-3) and (1-4) as a first component:

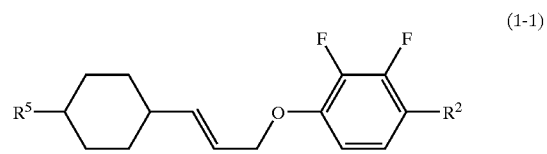

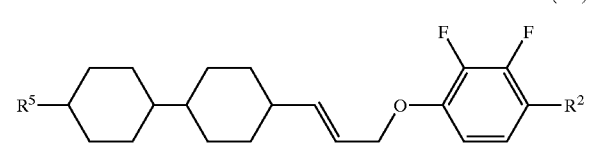

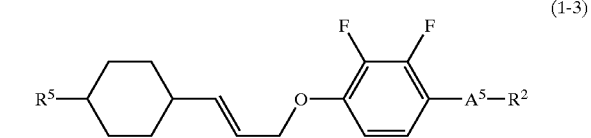

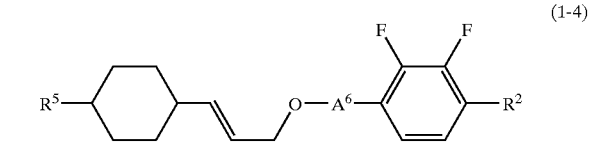

wherein $R^5$ is alkyl or alkenyl; $R^2$ is alkyl or alkoxy; $A^5$ is 1,4-phenylene or 2-fluoro-1,4-phenylene; and $A^6$ is 1,4-phenylene, 2-fluoro-1,4-phenylene or 2,3-difluoro-1,4-phenylene.

26 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates mainly to a liquid crystal composition suitable for use in an active matrix (AM) element, and an AM element including the composition.

2. Related Art

On a liquid crystal display element, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystal silicon. The latter is classified into a high temperature type and a low temperature type according to a production process. Classification based on a light source is a reflection type utilizing a natural light, a transmission type utilizing a backlight and a semi-transmission type utilizing both the natural light and the backlight.

These elements include a liquid crystal composition having suitable characteristics. General characteristics of the composition should be improved to obtain an AM element having good general characteristics. Table 1 below summarizes a relationship between the two general characteristics. The general characteristics of the composition will be explained further based on a commercially available AM element. A temperature range of a nematic phase relates to the temperature range in which the element can be used. A desirable range at a higher limit temperature of the nematic phase is 70° C. or more and a desirable range at a lower limit temperature is −20° C. or less. The viscosity of the composition relates to the response time of the element. A short response time is desirable for displaying a moving image. Accordingly, a small viscosity of the composition is desirable. A small viscosity at a low temperature is more desirable.

TABLE 1

General characteristics of a liquid crystal composition and an AM element.

| No. | General characteristics of a composition | General characteristics of an AM element |
|---|---|---|
| 1 | Temperature range of a nematic phase is wide | Usable temperature range is wide |
| 2 | Viscosity is small[1)] | Response time is short |
| 3 | Optical anisotropy is suitable | Contrast ratio is large |
| 4 | Dielectric anisotropy is positively or negatively large | Driving voltage is low and electric power consumption is small |
| 5 | Specific resistance is large | Voltage holding ratio is small and a contrast ratio is large |

[1)]Time for injecting a composition into a liquid crystal cell can be shortened.

The optical anisotropy of the composition relates to the contrast ratio of the element. A VA element makes use of electrically controlled birefringence. Then, a product (Δn·d) of the optical anisotropy (Δn) of a composition and the cell gap (d) of the element is designed to a fixed value in order to maximize a contrast ratio in the AV element. One example of this value is 0.275 μm. The cell gap (d) is usually 3 to 6 μm, and therefore an optical anisotropy in the composition falls in a range of 0.05 to 0.12. A large dielectric anisotropy of the composition contributes to a small driving voltage of the element. Accordingly, a large dielectric anisotropy is preferred. On the other hand, a composition having a negative dielectric anisotropy is used in an AV element of a VA mode. A large specific resistance of the composition contributes to a large voltage holding ratio and a large contrast ratio of the element. Accordingly, a composition having a large specific resistance in the initial stage is desirable. A composition having a large specific resistance even after it has been used for a long time is desirable.

A composition having a negative dielectric anisotropy contains a compound having a negative dielectric anisotropy. Such compound has a polar group in a minor axis direction of a compound molecule and is described in the following patent documents. JP H03-027340 A/1991 (U.S. Pat. No. 5,032,312), JP H03-066632 A/1991 (EP 0 410 233), and JP H04-330019 A/1992 (U.S. Pat. No. 5,204,018).

SUMMARY OF THE INVENTION

The present invention has a liquid crystal composition having a negative dielectric anisotropy, which comprising at least one compound selected from the group of compounds represented by Formulas (1-1), (1-2), (1-3) and (1-4) as a first component:

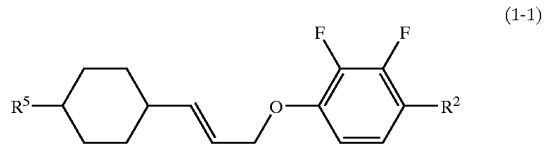

(1-1)

(1-2)

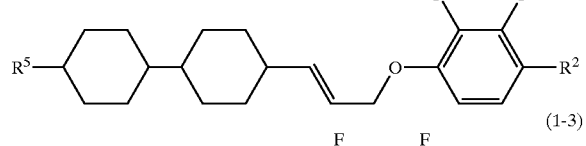

(1-3)

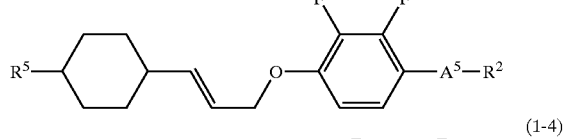

(1-4)

wherein $R^5$ is alkyl or alkenyl; $R^2$ is alkyl or alkoxy; $A^5$ is 1,4-phenylene or 2-fluoro-1,4-phenylene; and $A^6$ is 1,4-phenylene, 2-fluoro-1,4-phenylene or 2,3-difluoro-1,4-phenylene.

The present invention also has a liquid crystal display element including the liquid crystal composition described above.

DETAILED DESCRIPTION

Terms used in the specification and claims are defined as follows: The liquid crystal composition of the present invention or the liquid crystal display element of the present invention may occasionally be abbreviated as "the composition" or "the element", respectively. A liquid crystal display element is a general term for a liquid crystal display panel and a liquid crystal display module. Liquid crystalline compounds are a main component of a liquid crystal composition. A liquid crystalline compound is a general term for a compound having a liquid crystal phase such as a nematic phase, a smectic phase and so forth, and a general term for a compound having no liquid crystal phase and being useful as a component of the composition. At least one compound selected from a group of compounds represented by formula (1) may be abbreviated as "the compound (1)". The compounds represented by any other formula may also be abbreviated in the same manner.

A higher limit temperature of a nematic phase may be abbreviated as "a higher limit temperature". A lower limit temperature of a nematic phase may be abbreviated to "a lower limit temperature". "A specific resistance is large" means that a composition has a large specific resistance at the initial stage and the composition has a large specific resistance even after it has been used for a long time. "A voltage holding ratio is large" means that a element has a large voltage holding ratio at the initial stage and the element has a large voltage holding ratio even after it has been used for a long time. When characteristics such as optical anisotropy and so forth are explained, values measured by means of the method described in the Examples are used. The content (percentage) of a component compound in a composition means the percentage by weight (% by weight) based on the total weight of the composition.

An advantage of the present invention is to provide a liquid crystal composition which satisfies many characteristics among the characteristics such as a wide temperature range of a nematic phase, a small viscosity, a suitable optical anisotropy, a low threshold voltage and a large voltage holding ratio. One aspect of the invention is also to provide a liquid crystal composition properly balanced regarding many characteristics. Another aspect of the invention is to provide a liquid crystal display element including such a composition. A further aspect of the invention to provide an AM element of a VA mode including a composition with a small viscosity, an optical anisotropy ranging from 0.05 to 0.12 and a dielectric anisotropy ranging from −6.5 to −2.0, and having a voltage holding ratio.

1. A liquid crystal composition having a negative dielectric anisotropy, which includes at least one compound selected from a group of compounds represented by Formulas (1-1), (1-2), (1-3) and (1-4) as a first component:

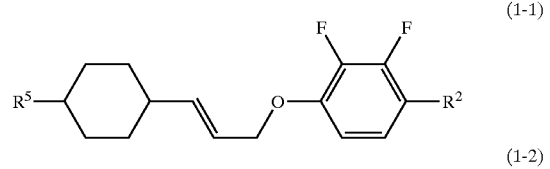

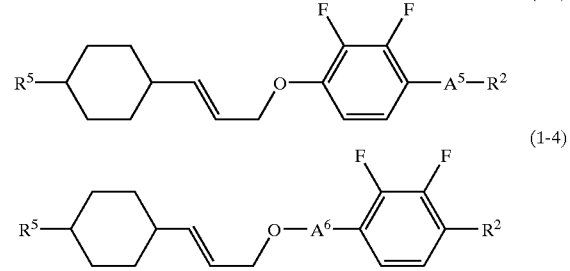

wherein $R^5$ is alkyl or alkenyl; $R^2$ is alkyl or alkoxy; $A^5$ is 1,4-phenylene or 2-fluoro-1,4-phenylene; and $A^6$ is 1,4-phenylene, 2-fluoro-1,4-phenylene or 2,3-difluoro-1,4-phenylene.

2. The liquid crystal composition according to item 1, wherein in Formulas (1-1), (1-2), (1-3) and (1-4), $R^5$ is alkyl, and $A^5$ and $A^6$ are 1,4-phenylene.

3. The liquid crystal composition according to item 1 or 2, wherein the first component is at least one compound selected from the group of the compounds represented by Formulas (1-1), (1-2) and (1-3).

That is, this item 3 relates to the liquid crystal composition comprising at least one compound selected from a group of compounds represented by Formulas (1-1-0), (1-2-0) and (1-3-0):

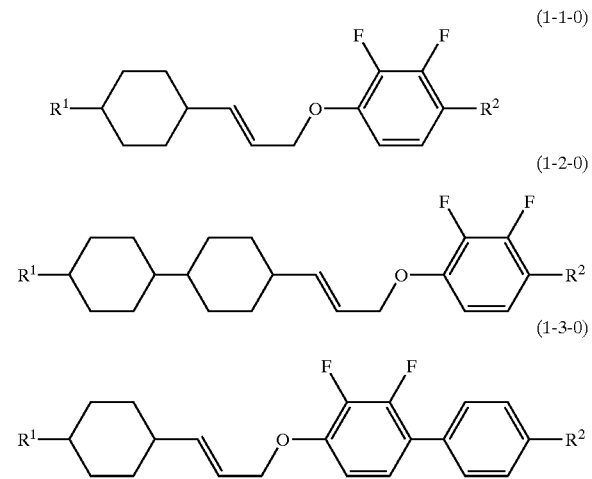

wherein $R^1$ is alkyl, and $R^2$ is alkyl or alkoxy.

4. The liquid crystal composition according to any one of the items 1 to 3, wherein the first component is in the range from 30% to 80% by weight, wherein range is based on the total weight of the liquid crystal composition.

5. The liquid crystal composition as described in any one of the items 1 to 4, further includes at least one compound selected from a group of compounds represented by Formulas (2), (3) and (4) as a second component:

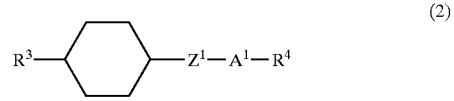

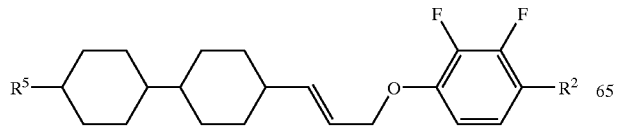

-continued

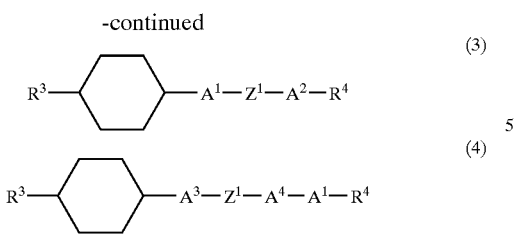

wherein $R^3$ and $R^4$ are independently alkyl, alkoxy, alkoxymethyl, —COO—$R^1$, alkenyl or alkenyl in which any hydrogen is replaced by fluorine; $R^1$ is alkyl; $A^1$ and $A^2$ are independently 1,4-cyclohexylene or 1,4-phenylene; $A^3$ and $A^4$ are independently 1,4-cyclohexylene, 1,4-phenylene or 2-fluoro-1,4-phenylene; and $Z^1$ is a single bond, —(CH$_2$)$_2$—, —COO— or —CH$_2$O—.

6. The liquid crystal composition according to item 5, wherein the second component is in the range from 20% to 70% by weight, wherein range is based on the total weight of the liquid crystal composition.
7. The liquid crystal composition according to any one of the items 1 to 6, further includes at least one compound selected from a group of compounds represented by Formula (5) as a third component:

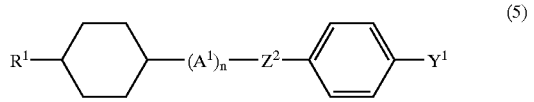

wherein $R^1$ is alkyl; $A^1$ is 1,4-cyclohexylene or 1,4-phenylene; $Z^2$ is a single bond or —COO—; $Y^1$ is fluorine or chlorine; and n is 0 or 1.
8. The liquid crystal composition according to item 7, wherein the third component is in the range from 3% to 20% by weight, wherein range is based on the total weight of the liquid crystal composition.
9. The liquid crystal composition according to any one of the items 1 to 8, a dielectric anisotropy of the liquid crystal composition has a value of −6.5 to −2.0.
10. A liquid crystal display element comprising the liquid crystal composition according to any one of the items 1 to 9.
11. The liquid crystal composition according to any one of the items 1 to 9, includes at least one compound selected from the group of the compounds represented by Formula (1-1) as described in the item 1.
12. The liquid crystal composition according to any one of the items 1 to 9, includes at least one compound selected from the group of the compounds represented by Formula (1-2) as described in the item 1.
13. The liquid crystal composition according to any one of the items 1 to 9, includes at least one compound selected from the group of the compounds represented by Formula (1-3) and (1-4) as described in the item 1.
14. The liquid crystal composition according to any one of the items 1 to 9, includes at least one compound selected from the group of the compounds represented by Formulas (1-1) as described in the item 1 and at least one compound selected from the group of the compounds represented by Formula (1-2) as described in the item 1.
15. The liquid crystal composition according to any one of the items 1 to 9, includes at least one compound selected from the group of the compounds represented by Formula (1-1) as described in the item 1 and at least one compound selected from the group of the compounds represented by Formula (1-3) and (1-4) as described in the item 1.
16. The liquid crystal composition according to any one of the items 1 to 9, includes at least one compound selected from the group of the compounds represented by Formula (1-2) as described in the item 1 and at least one compound selected from the group of the compounds represented by Formula (1-3) and (1-4) as described in the item 1.
17. The liquid crystal composition according to any one of the items 1 to 9, includes at least one compound selected from the group of the compounds represented by Formula (1-1) as described in the item 1, at least one compound selected from the group of the compounds represented by Formula (1-2) as described in the item 1 and at least one compound selected from the group of the compounds represented by Formula (1-3) and (1-4) as described in the item 1.
18. The liquid crystal composition according to any one of the items 1 to 9 and 11 to 17, includes at least one compound selected from the group of the compounds represented by Formula (2) as described in the item 3.
19. The liquid crystal composition according to any one of the items 1 to 9 and 11 to 17, includes at least one compound selected from the group of the compounds represented by Formula (3) as described in the item 3.
20. The liquid crystal composition according to any one of the items 1 to 9 and 11 to 17, includes at least one compound selected from the group of the compounds represented by Formula (4) as described in the item 3.
21. The liquid crystal composition according to any one of the items 1 to 9 and 11 to 17, includes at least one compound selected from the group of the compounds represented by Formula (2) as described in the item 3 and at least one compound selected from the group of the compounds represented by Formula (3) as described in the item 3.
22. The liquid crystal composition according to any one of the items 1 to 9 and 11 to 17, includes at least one compound selected from the group of the compounds represented by Formula (2) as described in the item 3 and at least one compound selected from the group of the compounds represented by Formula (4) as described in the item 3.
23. The liquid crystal composition according to any one of the items 1 to 9 and 11 to 17, includes at least one compound selected from the group of the compounds represented by Formula (3) as described in the item 3 and at least one compound selected from the group of the compounds represented by Formula (4) as described in the item 3.
24. The liquid crystal composition according to any one of the items 1 to 9 and 11 to 17, includes at least one compound selected from the group of the compounds represented by Formula (2) as described in the item 3, at least one compound selected from the group of the compounds represented by Formula (3) as described in the item 3 and at least one compound selected from the group of the compounds represented by Formula (4) as described in the item 3.
25. The liquid crystal composition according to any one of the items 1 to 9 and 11 to 24, includes a UV absorber or an antioxidant.
26. A liquid crystal display element comprising the liquid crystal composition according to any one of the items 11 to 25.

The composition of the present invention satisfies many characteristics among the characteristics such as a wide temperature range of a nematic phase, a small viscosity, a suitable optical anisotropy, a low threshold voltage and a large voltage holding ratios. The composition is properly balanced regarding many characteristics. The element of the present invention includes the composition. An element including the composition with a small viscosity, an optical anisotropy ranging from 0.05 to 0.12 and a dielectric anisotropy ranging from −6.5 to −2.0, has a large voltage holding ratio and is suitable for an AM element of a VA mode.

The composition of the present invention will be explained in the following order. First, the constitution of components in the composition will be explained. Second, the main characteristics of the component compounds and the main effects of the compounds influencing the composition will be explained. Third, a suitable ratio of the component compounds and its basis will be explained. Fourth, a desirable embodiment of the component compounds will be explained. Fifth, concrete examples of the component compounds will be shown. Sixth, the preparation methods of the component compounds will be explained. Last, additives which can be used for the liquid crystal composition will be explained.

First, the constitution of components in the composition will be explained. The combination of the compound (1-1) to the compound (5) are 98. The combination was classified into type 1 to type 98 and summarized in Table 2 and Table 3. A symbol of a circle (○) in Table 2 and Table 3 means that the corresponding compound is the component. A blank column means that the corresponding compound is not the component. For example, type 1 means that the compound (1-1) is the component of the composition.

TABLE 2

Combination examples (1) of the compounds

| | Compound (1-1) | Compound (1-2) | Compound (1-3) or (1-4) | Compound (2) | Compound (3) | Compound (4) |
|---|---|---|---|---|---|---|
| Type 1 | ○ | | | | | |
| Type 2 | | ○ | | | | |
| Type 3 | | | ○ | | | |
| Type 4 | ○ | ○ | | | | |
| Type 5 | ○ | | ○ | | | |
| Type 6 | | ○ | ○ | | | |
| Type 7 | ○ | ○ | ○ | | | |
| Type 8 | ○ | | | ○ | | |
| Type 9 | | ○ | | ○ | | |
| Type 10 | | | ○ | ○ | | |
| Type 11 | ○ | ○ | | ○ | | |
| Type 12 | ○ | | ○ | ○ | | |
| Type 13 | | ○ | ○ | ○ | | |
| Type 14 | ○ | ○ | ○ | ○ | | |
| Type 15 | ○ | | | | ○ | |
| Type 16 | | ○ | | | ○ | |
| Type 17 | | | ○ | | ○ | |
| Type 18 | ○ | ○ | | | ○ | |
| Type 19 | ○ | | ○ | | ○ | |
| Type 20 | | ○ | ○ | | ○ | |
| Type 21 | ○ | ○ | ○ | | ○ | |
| Type 22 | ○ | | | | | ○ |
| Type 23 | | ○ | | | | ○ |
| Type 24 | | | ○ | | | ○ |
| Type 25 | ○ | ○ | | | | ○ |
| Type 26 | ○ | | ○ | | | ○ |
| Type 27 | | ○ | ○ | | | ○ |
| Type 28 | ○ | ○ | ○ | | | ○ |
| Type 29 | ○ | | | ○ | ○ | |
| Type 30 | | ○ | | ○ | ○ | |
| Type 31 | | | ○ | ○ | ○ | |
| Type 32 | ○ | ○ | | ○ | ○ | |
| Type 33 | ○ | | ○ | ○ | ○ | |
| Type 34 | | ○ | ○ | ○ | ○ | |
| Type 35 | ○ | ○ | ○ | ○ | ○ | |
| Type 36 | ○ | | | ○ | | ○ |
| Type 37 | | ○ | | ○ | | ○ |
| Type 38 | | | ○ | ○ | | ○ |
| Type 39 | ○ | ○ | | ○ | | ○ |
| Type 40 | ○ | | ○ | ○ | | ○ |
| Type 41 | | ○ | ○ | ○ | | ○ |
| Type 42 | ○ | ○ | ○ | ○ | | ○ |
| Type 43 | ○ | | | ○ | ○ | ○ |
| Type 44 | | ○ | | ○ | ○ | ○ |
| Type 45 | | | ○ | ○ | ○ | ○ |
| Type 46 | ○ | ○ | | ○ | ○ | ○ |
| Type 47 | ○ | | ○ | ○ | ○ | ○ |
| Type 48 | | ○ | ○ | ○ | ○ | ○ |
| Type 49 | ○ | ○ | ○ | ○ | ○ | ○ |

TABLE 3

Combination examples (2) of the compounds

| | Compound (1-1) | Compound (1-2) | Compound (1-3) or (1-4) | Compound (2) | Compound (3) | Compound (4) | Compound (5) |
|---|---|---|---|---|---|---|---|
| Type 50 | ○ | | | | | | ○ |
| Type 51 | | ○ | | | | | ○ |
| Type 52 | | | ○ | | | | ○ |
| Type 53 | ○ | ○ | | | | | ○ |
| Type 54 | ○ | | ○ | | | | ○ |
| Type 55 | | ○ | ○ | | | | ○ |
| Type 56 | ○ | ○ | ○ | | | | ○ |
| Type 57 | ○ | | | ○ | | | ○ |
| Type 58 | | ○ | | ○ | | | ○ |
| Type 59 | | | ○ | ○ | | | ○ |
| Type 60 | ○ | ○ | | ○ | | | ○ |
| Type 61 | ○ | | ○ | ○ | | | ○ |
| Type 62 | | ○ | ○ | ○ | | | ○ |
| Type 63 | ○ | ○ | ○ | ○ | | | ○ |
| Type 64 | ○ | | | | ○ | | ○ |
| Type 65 | | ○ | | | ○ | | ○ |
| Type 66 | | | ○ | | ○ | | ○ |
| Type 67 | ○ | ○ | | | ○ | | ○ |
| Type 68 | ○ | | ○ | | ○ | | ○ |
| Type 69 | | ○ | ○ | | ○ | | ○ |
| Type 70 | ○ | ○ | ○ | | ○ | | ○ |
| Type 71 | ○ | | | | | ○ | ○ |
| Type 72 | | ○ | | | | ○ | ○ |
| Type 73 | | | ○ | | | ○ | ○ |
| Type 74 | ○ | ○ | | | | ○ | ○ |
| Type 75 | ○ | | ○ | | | ○ | ○ |
| Type 76 | | ○ | ○ | | | ○ | ○ |
| Type 77 | ○ | ○ | ○ | | | ○ | ○ |
| Type 78 | ○ | | | ○ | ○ | | ○ |
| Type 79 | | ○ | | ○ | ○ | | ○ |
| Type 80 | | | ○ | ○ | ○ | | ○ |
| Type 81 | ○ | ○ | | ○ | ○ | | ○ |
| Type 82 | ○ | | ○ | ○ | ○ | | ○ |
| Type 83 | | ○ | ○ | ○ | ○ | | ○ |
| Type 84 | ○ | ○ | ○ | ○ | ○ | | ○ |
| Type 85 | ○ | | | ○ | | ○ | ○ |
| Type 86 | | ○ | | ○ | | ○ | ○ |
| Type 87 | | | ○ | ○ | | ○ | ○ |
| Type 88 | ○ | ○ | | ○ | | ○ | ○ |
| Type 89 | ○ | | ○ | ○ | | ○ | ○ |
| Type 90 | | ○ | ○ | ○ | | ○ | ○ |
| Type 91 | ○ | ○ | ○ | ○ | | ○ | ○ |
| Type 92 | ○ | | | ○ | ○ | ○ | ○ |
| Type 93 | | ○ | | ○ | ○ | ○ | ○ |
| Type 94 | | | ○ | ○ | ○ | ○ | ○ |
| Type 95 | ○ | ○ | | ○ | ○ | ○ | ○ |
| Type 96 | ○ | | ○ | ○ | ○ | ○ | ○ |
| Type 97 | | ○ | ○ | ○ | ○ | ○ | ○ |
| Type 98 | ○ | ○ | ○ | ○ | ○ | ○ | ○ |

The composition of the present invention is classified into composition A and composition B. The composition A may further include other compounds. The "other compounds" include a liquid crystalline compound, an additives and so forth. The liquid crystalline compound is different from the compounds (1-1) to (5). This liquid crystalline compound is mixed with the composition for the purpose of adjusting the characteristics of the composition. The additives includes an optically active compound, a dye, UV absorber and an antioxidant. The optically active compound is mixed to the composition for the purpose of giving a twist angle by means of inducing a helical structure. The dye is mixed with the composition to adjust the element of a guest host (GH) mode. The UV absorber or the antioxidant is mixed with the composition for the purpose of improving a light stability or a thermal stability of the liquid crystal composition.

The composition B essentially consists of the compounds selected from the compounds (1) to (8). The term "essentially" means that the composition does not include a liquid crystalline compound which is different from these compounds. The term "essentially" also means that the composition may further include an impurity, an optically active compound, a dye, a UV absorber and an antioxidant and so forth. The components of the composition B is fewer in comparison with those of the composition A. The composition B is preferable to the composition A from the viewpoint of costs. The composition A is preferable to the composition B, because the physical properties of the composition A can be further adjusted by mixing with other liquid crystalline compounds.

Second, the main characteristics of the component compounds and the main effects of the compounds influencing the composition will be explained. The main characteristics of the compounds are summarized in Table 4. In Table 4, the letter L represents large or high, the letter M represents a middle degree and the letter S represents small or low. The number 0 indicates that the dielectric anisotropy is nearly zero (or very small). Letters L, M and S are relative evaluations in these compounds.

TABLE 4

| | Characteristics of the compounds | | | | | | | |
|---|---|---|---|---|---|---|---|---|
| | (1-1) | (1-2) | (1-3) | (1-4) | (2) | (3) | (4) | (5) |
| Higher limit temperature | S | M | M | M | S | M | L | S to M |
| Viscosity | M | M | M | M | S | S | S | S to M |
| Optical anisotropy | S | M | L | L | S | M | M to L | S to M |
| Dielectric anisotropy | L[1] | L[1] | L[1] | L[1] | 0 | 0 | 0 | S[2] |
| Specific resistance | L | L | L | L | L | L | L | L |

[1] Dielectric anisotropy is negative
[2] Dielectric anisotropy is positive

Third, a suitable ratio of the component compounds and its basis will be explained. The first component is the compound selected from the compounds (1-1), (1-2), (1-3) and (1-4). A desirable ratio of the first component is 30% or more in order to negatively increase the dielectric anisotropy and 80% or less in order to reduce the lower limit temperature. A more desirable ratio is 40% to 75%.

The second component is the compound selected from the compounds (2), (3) and (4). The desirable proportion of the second component is 20% or more in order to reduce the viscosity and 70% or less in order to reduce the lower limit temperature or negatively increase the dielectric anisotropy. A more desirable ratio is 25% to 60%.

The third component is the compound selected from the compounds (5). When further mixing the third component, A desirable ratio of the third component is 3% or more in order to further control the characteristics and 20% or less in order to negatively increase the dielectric anisotropy. A more desirable ratio is 3% to 10%.

Fourth, a desirable embodiment of the component compounds will be explained. The symbol $R^5$ is used for many compounds in the formula for the component compounds. In these compounds, the meaning of $R^5$ may be the same or different. For example, there is a case in which $R^5$ in the compound (1-1) is ethyl and in which $R^5$ in the compound (1-2) is ethyl. There is as well a case in which $R^5$ in the compound (1-1) is ethyl and in which $R^5$ in the compound (1-2) is propyl. This rule is also applicable to the symbols $R^1, R^2, R^3, R^4, A^1, A^2, A^3, A^4, A^5, A^6, Z^1, Z^2, Y^1$ and n.

Desirable $R^1$ is alkyl of 1 to 10 carbon. Desirable $R^2$ is alkyl of 1 to 10 carbon and alkoxy of 1 to 10 carbon. Desirable $R^3$ is alkyl of 1 to 10 carbon, alkoxy of 1 to 10 carbon, alkoxymethyl of 2 to 10 carbon, —COO—$R^1$, alkenyl of 2 to 10 carbon and alkenyl of 2 to 10 carbon in which any hydrogen is replaced by fluorine. Desirable $R^4$ is alkyl of 1 to 10 carbon atoms, alkoxy of 1 to 10 carbon, alkoxymethyl of 2 to 10 carbon, —COO—$R^1$, alkenyl of 2 to 10 carbon and alkenyl of 2 to 10 carbon in which any hydrogen is replaced by fluorine. Desirable $R^5$ is alkyl of 1 to 10 carbon and alkenyl of 2 to 10 carbon. More desirable $R^5$ is alkyl of 1 to 10 carbon.

Desirable alkyl is methyl, ethyl, propyl, butyl, pentyl, hexyl, heptyl and octyl. More desirable alkyl is ethyl, propyl, butyl, pentyl and heptyl.

Desirable alkoxy is methoxy, ethoxy, propoxy, butoxy, pentyloxy, hexyloxy and heptyloxy. More desirable alkoxy is methoxy and ethoxy.

Desirable alkoxymethyl is methoxymethyl, ethoxymethyl, propoxymethyl, butoxymethyl and pentyloxymethyl. More desirable alkoxymethyl is butoxymethyl.

Desirable —COO—$R^1$ is methoxycarbonyl, ethoxycarbonyl, propoxycarbonyl and butoxycarbonyl. More Desirable —COO—$R^1$ is methoxycarbonyl.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexeny and 5-hexenyl. More desirable alkenyl is vinyl, 1-propenyl, 3-butenyl and 3-pentenyl. Desirable configuration of —CH=CH— in these alkenyls relies on the position of a double bond. A trans position is desirable in alkenyl such as 1-propenyl, 1-butenyl, 1-pentenyl, 1-hexenyl, 3-pentenyl and 3-hexenyl. A cis position is desirable in alkenyl such as 2-butenyl, 2-pentenyl and 2-hexenyl.

Desirable examples of alkenyl in which any hydrogen is replaced by fluorine are 2,2-difluorovinyl, 3,3-difluoro-2-propenyl, 4,4-difluoro-3-butenyl and 5,5-difluoro-4-pentenyl. More preferred examples are 2,2-difluorovinyl and 4,4-difluoro-3-butenyl.

$A^5$ is 1,4-phenylene or 2-fluoro-1,4-phenylene, and $A^6$ is 1,4-phenylene, 2-fluoro-1,4-phenylene or 2,3-difluoro-1,4-phenylene. 3-Fluoro-1,4-phenylene is structurally the same as 2-fluoro-1,4-phenylene, and therefore the former is not shown as the example.

In the component compounds, cis is preferable to trans for the configuration of 1,4-cyclohexylene. Cis is preferable to trans for the configuration in a double bond of a linkage group —CH=CH—CH$_2$—O—.

Fifth, concrete examples of the component compounds will be shown. The desirable compound (1-1) to compound (5) are the compound (1-1-1) to the compound (5-7). The more desirable compound (1-1) to compound (5) are the compound (1-1-1) to the compound (1-3-2) and the compound (2-1) to the compound (5-4). In these desirable compounds, the symbols $R^1$ and $R^5$ were used for the plural compounds. In the optional two compounds, the specific groups represented by $R^1$ may be the same or different. This has already been described.

$R^1$ is alkyl, and $R^5$ is alkyl or alkenyl. Desirable $R^1$ is alkyl of 1 to 10 carbon. Desirable $R^5$ is alkyl of 1 to 10 carbon and alkenyl of 2 to 10 carbon. Desirable alkyl or alkenyl and more desirable alkyl or alkenyl have already been described. In the alkenyl, the desirable configurations of —CH=CH— have already been described. In these desirable compounds, cis is preferable to trans for the configuration of 1,4-phenylene is preferably. Cis is preferable to trans for the configuration in a double bond of a linkage group —CH=CH—CH$_2$—O—.

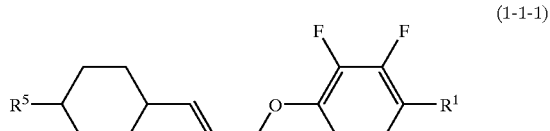

(1-1-1)

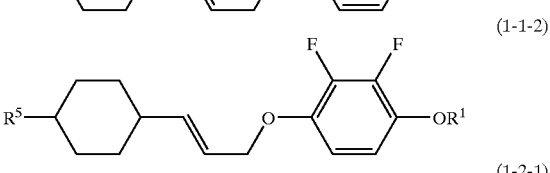

(1-1-2)

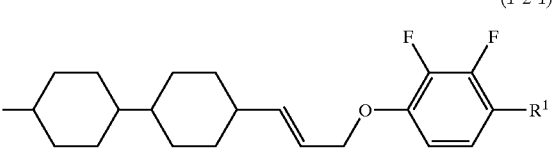

(1-2-1)

(1-2-2)
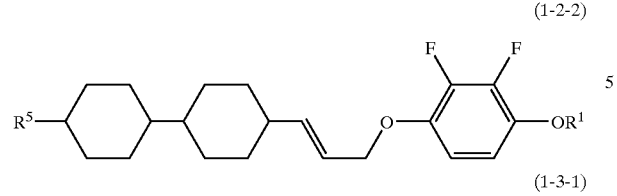
(1-3-1)
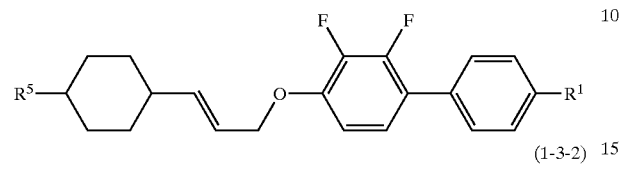
(1-3-2)
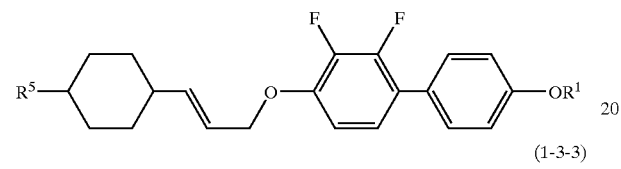
(1-3-3)
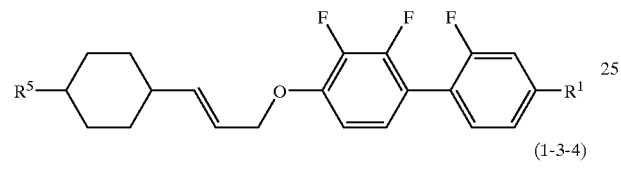
(1-3-4)
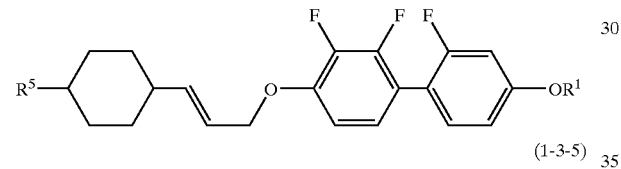
(1-3-5)
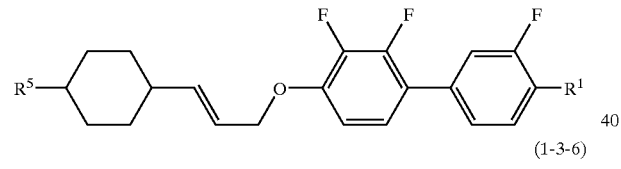
(1-3-6)
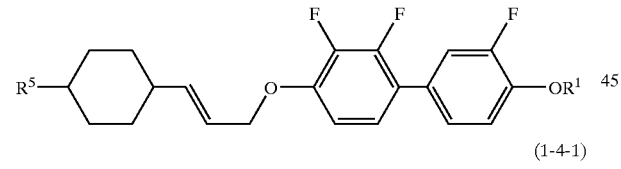
(1-4-1)
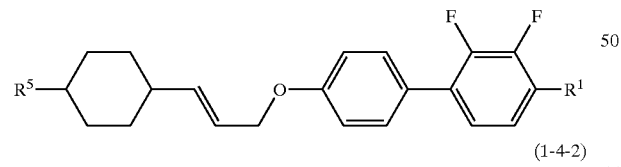
(1-4-2)
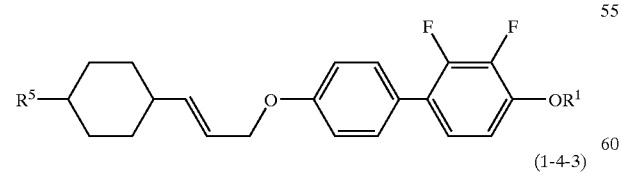
(1-4-3)
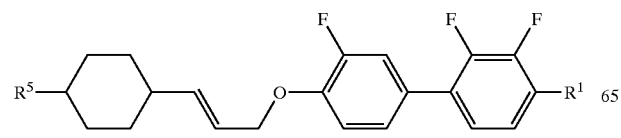
(1-4-4)
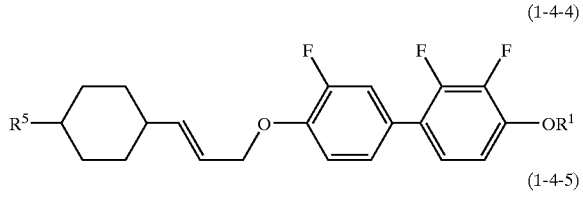
(1-4-5)
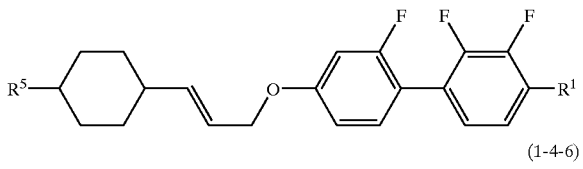
(1-4-6)
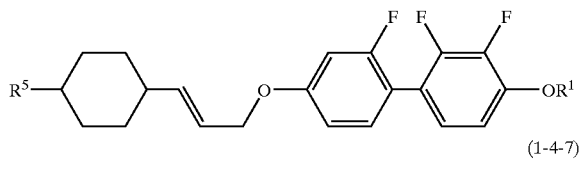
(1-4-7)
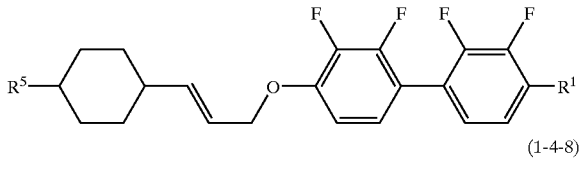
(1-4-8)
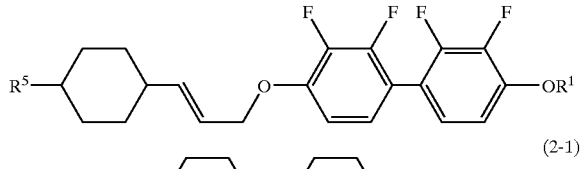
(2-1)
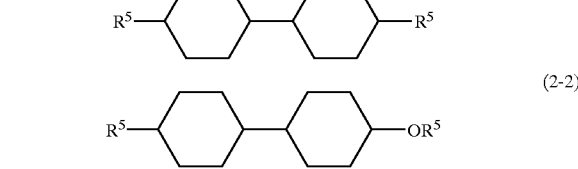
(2-2)
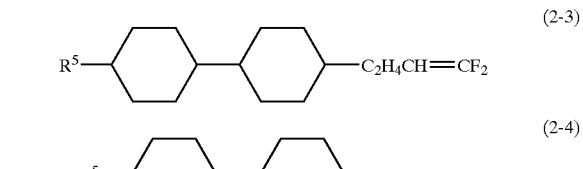
(2-3)
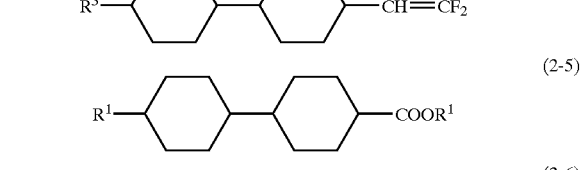
(2-4)
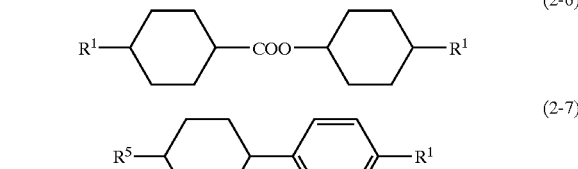
(2-5)
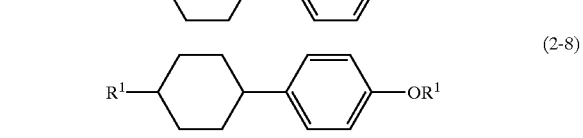
(2-6)
(2-7)
(2-8)

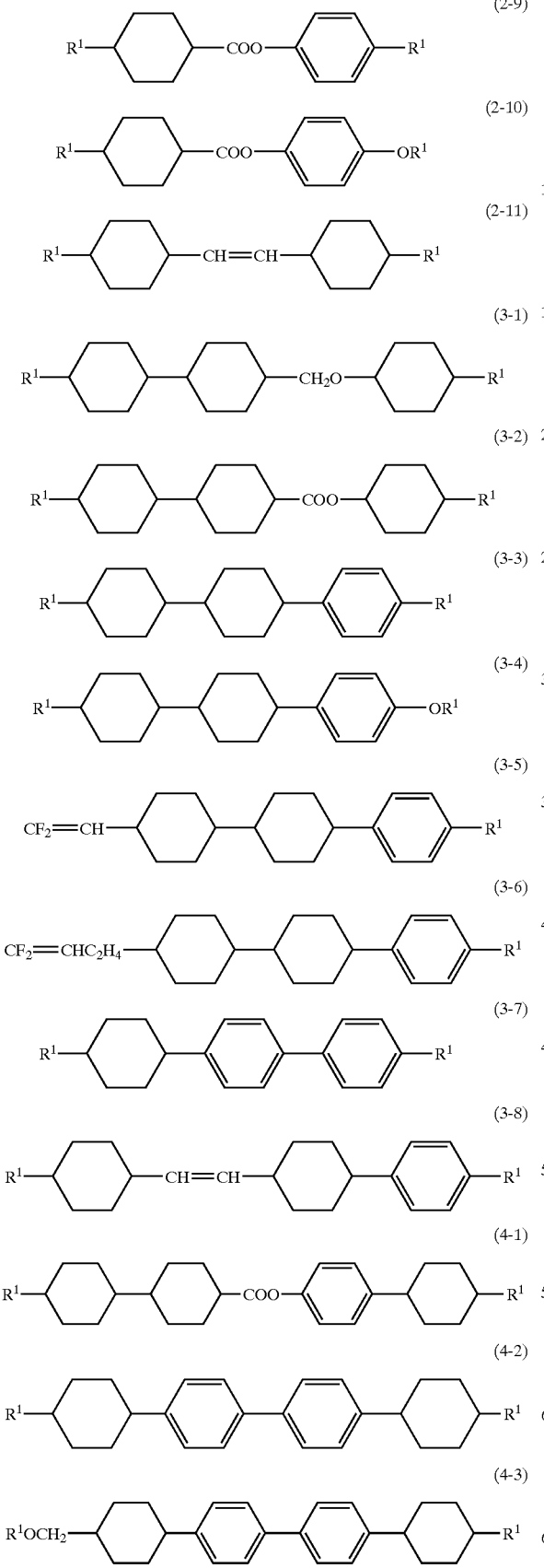
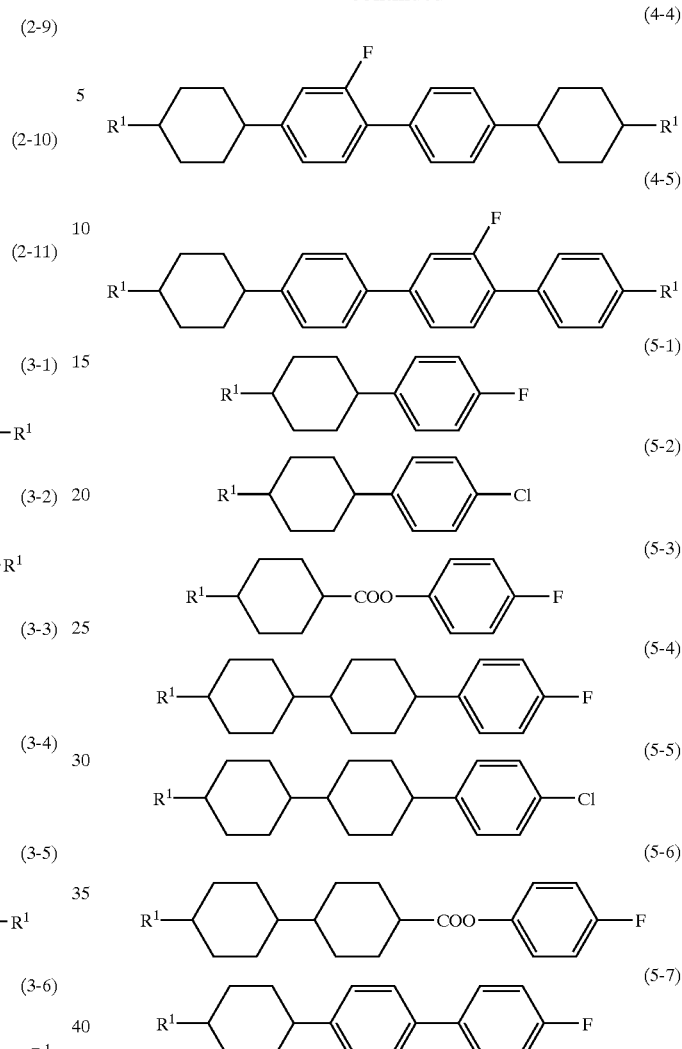

Sixth, the preparation methods of the component compounds will be explained. These compounds are prepared by known methods. The preparation method will be exemplified. The compounds (1-1-2), (1-2-2) and (1-3-2) are prepared by modifying the method disclosed in JP H03-027340 A/1998. The compound (2-1) is prepared by modifying the method disclosed in JP S59-070624 A/1984. The compound (3-3) is prepared by modifying the method disclosed in JP S57-165328 A/1982. The compound (4-3) is prepared by modifying the method disclosed in JP S58-219137 A/1983. The compound (5-6) is prepared by modifying the method disclosed in JP S56-135445 A/1981.

The compounds where their preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and so forth. The composition is prepared according to known methods of mixing the compounds thus obtained. For example, the component compounds are mixed and dissolved in each other by heating.

Seventh, additives which can be used for the liquid crystal composition will be explained. These additives are an optically active compound, a dye, a UV absorber and an antioxidant. The desirable optically active compound is compounds (Op-1) to (Op-13).

(Op-1)
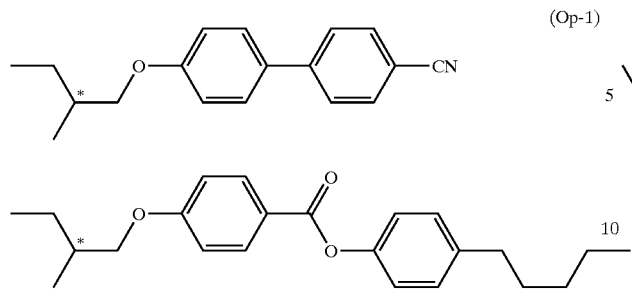
(Op-2)
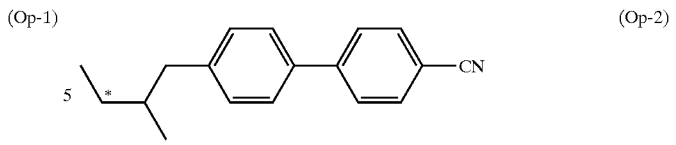
(Op-3)
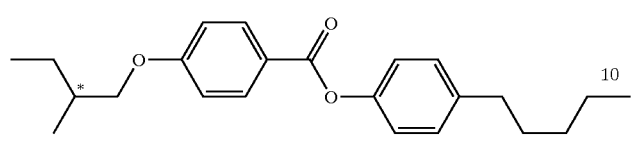
(Op-4)
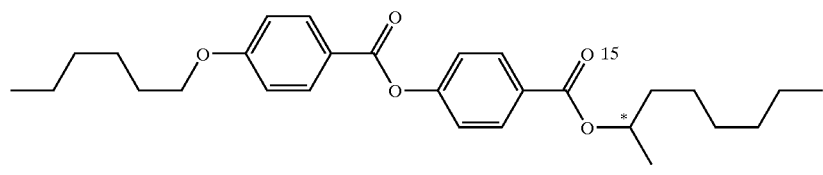
(Op-5)
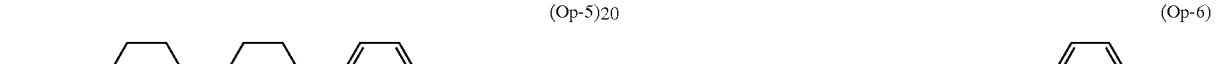
(Op-6)
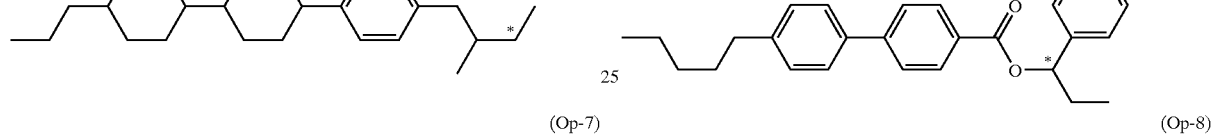
(Op-7)
(Op-8)
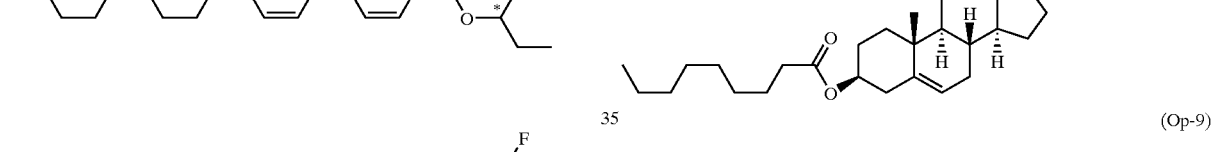
(Op-9)
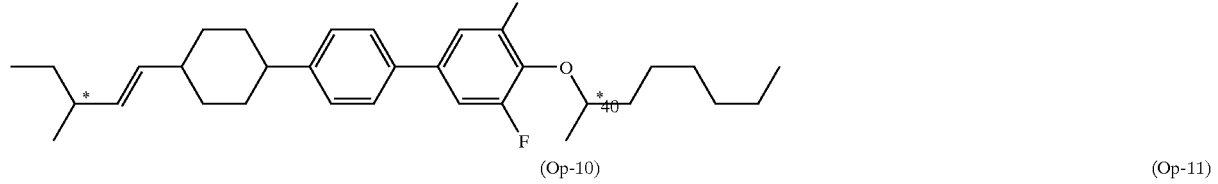
(Op-10)
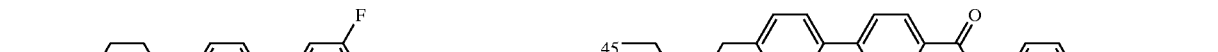
(Op-11)
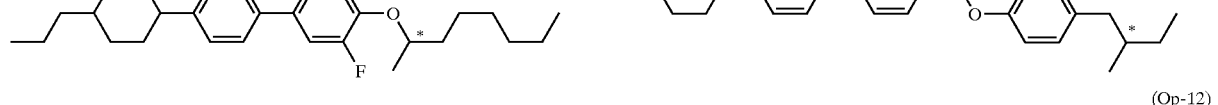
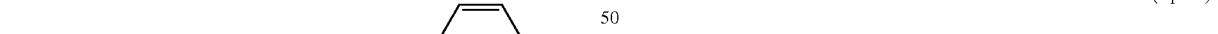
(Op-12)
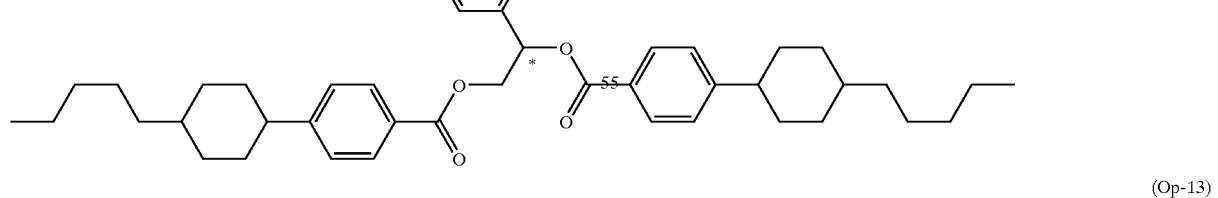
(Op-13)
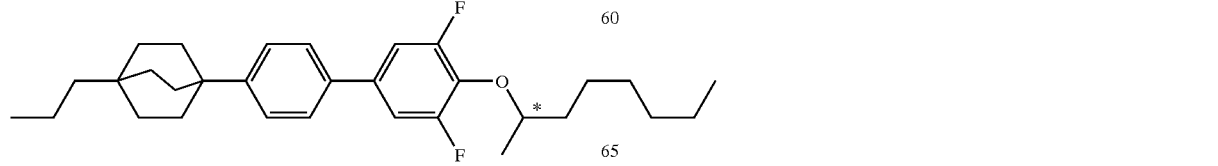

The desirable dye is a compound such as merocyanine, styryl, azo, azomethine, azoxy, quinophthalone, anthraquinone and tetrazine.

The desirable UV absorber is benzophenones, benzoates and triazoles. The desirable benzophenones are 2-hydroxy-4-octoxybenzophenone and the like. Desirable benzoates are 2,4-di-t-butylphenyl-3,5-di-t-butyl-4-hydroxybenzoate and the like. The desirable triazoles are 2-(2-hydroxy-5-methylphenyl)benzotriazole, 2-[2-hydroxy-3-(3,4,5,6-tetrahydroxyphthalimidemethyl)-5-methylphenyl] benzotriazole and 2-(3-t-butyl-2-hydroxy-5-methylphenyl)-5-chlorobenzotriazole.

The desirable antioxidant is phenols and organic sulfur compounds. The desirable phenols are 3,5-di-t-butyl-4-hydroxytoluene, 2,2'-methylenebis(6-t-butyl-4-methylphenol), 4,4'-butylidenebis(6-t-butyl-3-methylphenol), 2,6-di-t-butyl-4-(2-octadecyloxycarbonyl) ethylphenol and pentaerythritol tetrakis[3-(3,5-di-t-butyl-4-hydroxyphenyl)propionate]. The desirable organic sulfur compounds are dilauryl-3,3'-thiodipropionate, dimyristyl-3,3'-thiodipropionate, distearyl-3,3'-thiodipropionate, pentaerythritol tetrakis(3-laurylthiopropionate) and 2-mercaptobenzimidazole.

A specific resistance is reduced in a certain case by irradiating a liquid crystal composition with a UV ray. In order to prevent this, a large amount of a UV absorber is preferably added to the liquid crystal composition. A specific resistance is reduced in a certain case by heating a liquid crystal composition. In order to prevent this, a large amount of an antioxidant is preferably added to the liquid crystal composition. A large amount of a UV absorber or an antioxidant lowers the characteristics of a liquid crystal composition in a certain case. For example, these additives reduce the lower limit temperature in a certain case. Accordingly, a small amount of the UV absorber or the antioxidant is preferably added to the liquid crystal composition. A desirable proportion of the UV absorber or the antioxidant is in the range from 0.001% to 0.05% by weight based on the total weight of the liquid crystal composition. The more desirable proportion is in the range from 0.003% to 0.03%. The very desirable proportion is in the range from 0.004% to 0.02%.

At least one of the additives such as the optically active compound, the dye, the UV absorber and the antioxidant may be added to the liquid crystal composition. The examples thereof are one optically active compound, both of one optically active compound and one UV absorber and two UV absorbers.

Eighth, the application thereof to a liquid crystal display element will be explained. The composition has principally a dielectric anisotropy ranging from −6.5 to −2.0 and an optical anisotropy ranging from 0.05 to 0.12. The preferred dielectric anisotropy falls in the range from −5.0 to −2.5. The composition having an optical anisotropy ranging from 0.05 to 0.18 and the composition having an optical anisotropy ranging from 0.05 to 0.20 may be prepared by controlling a proportion of the compounds which are the components or mixing the other compounds. Accordingly, the composition is suited particularly to an AM element of a transmission type having a VA mode.

The composition of the present invention can be used not only for an AM element but also a PM element. The composition can be used for elements having modes such as PC, TN, STN, ECB, OCB and IPS. These elements may be a reflection type, a transmission type or a semi-transmission type. The composition can be used as well for an NCAP (nematic curvilinear aligned phase) element prepared by microcapsulizing the composition and a PD (polymer dispersed) element in which a three-dimensional network polymer is formed in the composition, for example, a PN (polymer network) element.

EXAMPLES

The present invention will be explained in detail by way of examples. The present invention is not limited by the Examples below. The compounds described in the Comparative Examples and Examples are expressed by the symbols based on the definition described in Table 5. In Table 5, the configuration of 1,4-cyclohexylene is trans. The configuration regarding a bonding group of —CH=CH—CH$_2$—O— is trans. The parenthesized number next to the symbolized compounds in the Examples corresponds to the number of the desirable compound. The symbol (-) means "other compounds". The ratio of compounds (percentage) is percentage by weight (% by weight) based on the total weight of the composition. Finally, the characteristics of the composition are summarized.

TABLE 5

Notation of compounds using codes

R—(A1)—Z1———---Zn—(An)—X

| 1) Left end group R— | Code | 2) Bonding group —Zn— | Code |
|---|---|---|---|
| $C_nH_{2n+1}$— | n- | —COO— | E |
| $C_nH_{2n+1}OC_mH_{2m}$— | nOm- | —CH=CH— | V |
| $CH_2$=CH— | V- | —CH$_2$O— | 1O |
| $CH_2$=CHC$_n$H$_{2n}$— | Vn- | —CH=CHCH$_2$O— | V1O |
| $CF_2$=CH— | VFF- | | |

| 3) Ring structure —An— | Code | 4) Right end group —X | Code |
|---|---|---|---|

| | B | —F | —F |

TABLE 5-continued

Notation of compounds using codes
R—(A1)—Z1———Zn—(An)—X

| Structure | (A1) | -X group | Code |
|---|---|---|---|
| [benzene ring with F] | B(F) | —Cl | -CL |
| [benzene ring with F] | B(2F) | —$C_nH_{2n+1}$ | -n |
| [benzene ring with 2F,3F] | B(2F,3F) | —$OC_nH_{2n+1}$ | —On |
| [cyclohexane] | H | —CH=$CH_2$ | -V |
| | | —$C_nH_{2n}$CH=$CH_2$ | -nV |
| | | —CH=$CF_2$ | -VFF |
| | | —$COOCH_3$ | -EMe |

5) Notation example

Example 1 5-HEB-O2

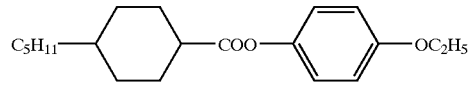

Example 2 3-HHV1OB(2F, 3F)-O2

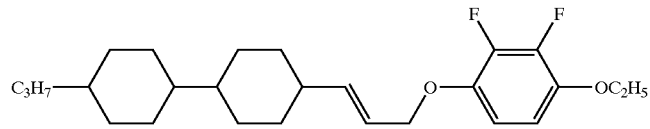

Example 3 1O1-HBBH-5

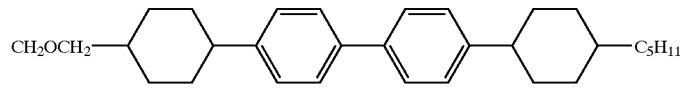

The measurement of the characteristics was carried out according to the following methods.

A higher limit temperature of a nematic phase (NI; ° C.): A sample was placed on a hot plate in a melting point apparatus equipped with a polarizing microscope and was heated at the rate of 1° C. per minute. The temperature was measured when a part of the sample began to change from a nematic phase into an isotropic liquid. A higher limit temperature of a nematic phase may be abbreviated to "a higher limit temperature".

A lower limit temperature of a nematic phase (Tc; ° C.) A sample having a nematic phase was kept in a freezer at temperatures of 0° C., −10° C., −20° C., −30° C., and −40° C. for ten days, respectively, and a liquid crystal phase was observed. For example, when the sample remained in a nematic phase at −20° C. and the sample changed to crystals or a smectic phase at −30° C., Tc was expressed as <−20° C. A lower limit temperature may be abbreviated to "a lower limit temperature".

Optical anisotropy (Δn; measured at 25° C.): An optical anisotropy was measured by means of an Abbe refractometer with light having the wavelength of 589 nm.

Viscosity (η; mPa·s, measured at 20° C.): A viscosity was measured by means of an E-type viscometer.

Dielectric anisotropy (Δ∈; measured at 25° C.): A sample was poured into a homeotropic aligning element in which the cell gap between two glass plates was 20 micrometers. A dielectric constant (∈∥) that is parallel to a liquid crystal molecule was measured by applying a voltage of 0.5 volt to the element. A sample was poured into a TN element in which the cell gap between two glass plates was 9 micrometers. A dielectric constant (∈⊥) that is perpendicular to a liquid crystal molecule was measured by applying a voltage of 0.5 volt to the element. A value of dielectric anisotropy was calculated from an equation of $\Delta\epsilon = \epsilon\| - \epsilon\perp$. A composition having a positive dielectric constant was measured by this method. When a sample is a compound, a dielectric anisotropy was measured after the sample had been mixed with a suitable liquid crystal composition.

Voltage holding ratio (VHR; measured at 25° C. and 100° C.; %): The measurement was carried out according to the method for measuring a voltage holding ratio of an element having a liquid crystal composition and an alignment film, which is described in EIAJ.ED-2521A of Standard of Electric Industries Association of Japan. A TN element used for the measurement had a polyimide alignment film and the element's cell gap was 6 micrometers. A wave form of the voltage applied to a TN element at 25° C. was observed by means of a cathode ray oscilloscope and an area between a voltage curve and a horizontal line in one unit frequency was obtained. After the TN element had been removed, an area was obtained from a wave form of the voltage applied in a similar manner. A voltage holding ratio was calculated by the comparison of the two areas. The value thus obtained was expressed as VHR-1. Next, this TN element was heated at 100° C. to obtain a voltage holding ratio by the same method. The value was shown by VHR-2.

Example 1

| | | |
|---|---|---|
| 2-HV1OB(2F,3F)-O2 | (1-1-2) | 7% |
| 3-HV1OB(2F,3F)-O2 | (1-1-2) | 7% |
| 2-HHV1OB(2F,3F)-1 | (1-2-1) | 9% |
| 3-HHV1OB(2F,3F)-1 | (1-2-1) | 9% |
| 2-HHV1OB(2F,3F)-O2 | (1-2-2) | 11% |
| 3-HHV1OB(2F,3F)-O2 | (1-2-2) | 11% |
| 2-HH-5 | (2-1) | 13% |
| 3-HH-4 | (2-1) | 15% |
| 3HB-O2 | (2-8) | 14% |
| 3-HHB-1 | (3-3) | 4% |

NI = 70.5° C.; $T_c$ < -20° C.; $\Delta n$ = 0.080; $\eta$ = 19.9 mPa · s; $\Delta\epsilon$ = -3.9; VHR - 1 = 99.1%.

Example 2

| | | |
|---|---|---|
| 2-HV1OB(2F,3F)-1 | (1-1-1) | 4% |
| 3-HV1OB(2F,3F)-1 | (1-1-1) | 6% |
| 3-HV1OB(2F,3F)-2 | (1-1-1) | 10% |
| 2-HHV1OB(2F,3F)-1 | (1-2-1) | 9% |
| 3-HHV1OB(2F,3F)-1 | (1-2-1) | 9% |
| 5-HHV1OB(2F,3F)-1 | (1-2-1) | 14% |
| 3-HV1OB(2F,3F)B-1 | (1-3-1) | 13% |
| 3-HH-4 | (2-1) | 10% |
| 5-HH-VFF | (2-4) | 2% |
| 3-HEH-3 | (2-6) | 2% |
| 3-HB-O2 | (2-8) | 7% |
| 3-HH1OH-3 | (3-1) | 2% |
| 3-HHB-1 | (3-3) | 6% |
| 3-HHB-O1 | (3-4) | 4% |
| VFF-HHB-1 | (3-5) | 2% |

NI = 74.0° C.; $T_c$ < -20° C.; $\Delta n$ = 0.094; $\eta$ = 28.0 mPa · s; $\Delta\epsilon$ = -3.0; VHR -1 = 99.0%.

Example 3

| | | |
|---|---|---|
| 2-HV1OB(2F,3F)-O2 | (1-1-2) | 9% |
| 3-HV1OB(2F,3F)-O1 | (1-1-2) | 8% |
| 2-HHV1OB(2F,3F)-O2 | (1-2-2) | 10% |
| 3-HHV1OB(2F,3F)-O1 | (1-2-2) | 10% |
| 3-HHV1OB(2F,3F)-O2 | (1-2-2) | 11% |
| 5-HHV1OB(2F,3F)-O2 | (1-2-2) | 11% |
| 2-HH-5 | (2-1) | 10% |
| 3-HH-4 | (2-1) | 15% |
| 7-HB-1 | (2-7) | 5% |
| 3-HHB-1 | (3-3) | 3% |
| 3-HHB-O1 | (3-4) | 2% |
| 3-HHEB-F | (5-6) | 3% |
| 5-HHEB-F | (5-6) | 3% |

NI = 83.8° C.; $T_c$ < -20° C.; $\Delta n$ = 0.083; $\eta$ = 26.5 mPa · s; $\Delta\epsilon$ = -4.4; VHR - 1 = 99.2%.

Example 4

| | | |
|---|---|---|
| 2-HV1OB(2F,3F)-1 | (1-1-1) | 4% |
| 3-HV1OB(2F,3F)-O2 | (1-1-2) | 9% |
| 3-HHV1OB(2F,3F)-1 | (1-2-1) | 10% |
| 3-HHV1OB(2F,3F)-2 | (1-2-1) | 9% |
| 3-HHV1OB(2F,3F)-O1 | (1-2-2) | 9% |
| 3-HV1OB(2F,3F)B-1 | (1-3-1) | 10% |
| 3-HH-4 | (2-1) | 12% |
| 3-HH-EMe | (2-5) | 2% |
| 7-HB-1 | (2-7) | 5% |
| 3-HB-O2 | (2-8) | 7% |
| 3-HVH-3 | (2-11) | 2% |
| 3-HHB-1 | (3-3) | 3% |
| 3-HHB-3 | (3-3) | 4% |
| 5-HBB-2 | (3-7) | 2% |
| 3-HVHB-3 | (3-8) | 2% |
| 3-HHEBH-3 | (4-1) | 3% |
| 1O1-HBBH-5 | (4-3) | 4% |
| 5HBB(F)B-2 | (4-5) | 3% |

NI = 85.8° C.; $T_c$ < -20° C.; $\Delta n$ = 0.096; $\eta$ = 26.2 mPa · s; $\Delta\epsilon$ = -2.9; VHR - 1 = 98.9%.

Example 5

| | | |
|---|---|---|
| 3-HV1OB(2F,3F)-1 | (1-1-1) | 8% |
| 3-HV1OB(2F,3F)-O1 | (1-1-2) | 9% |
| 3-HHV1OB(2F,3F)-2 | (1-2-1) | 9% |
| 3-HHV1OB(2F,3F)-O2 | (1-2-2) | 15% |
| 3-HV1OB(2F,3F)B-1 | (1-3-1) | 10% |
| 2-HH-5 | (2-1) | 4% |
| 5-HH-V | (2-1) | 10% |
| 3-HH-2V | (2-1) | 5% |
| 3-HH-O1 | (2-2) | 6% |
| 3-HB-O1 | (2-8) | 5% |
| 3-HHEH-3 | (3-2) | 3% |
| 3-HHB-1 | (3-3) | 3% |
| V-HHB-1 | (3-3) | 4% |
| 3-HHEBH-3 | (4-1) | 3% |
| 5-HBBH-3 | (4-2) | 3% |
| 5-HB(F)BH-3 | (4-4) | 3% |

NI = 78.1° C.; $T_c$ < -20° C.; $\Delta n$ = 0.087; $\eta$ = 28.3 mPa · s; $\Delta\epsilon$ = -3.0; VHR - 1 = 98.9%.

Example 6

| | | |
|---|---|---|
| 2-HV1OB(2F,3F)-1 | (1-1-1) | 5% |
| 2-HV1OB(2F,3F)-O2 | (1-1-2) | 6% |
| 3-HV1OB(2F,3F)-O2 | (1-1-2) | 6% |
| 2-HHV1OB(2F,3F)-1 | (1-2-1) | 9% |
| 3-HHV1OB(2F,3F)-1 | (1-2-1) | 9% |
| 2-HHV1OB(2F,3F)-O2 | (1-2-2) | 11% |
| 3-HHV1OB(2F,3F)-O2 | (1-2-2) | 12% |
| 5-HHV1OB(2F,3F)-O2 | (1-2-2) | 12% |
| 2-HH-5 | (2-1) | 10% |
| 3-HH-4 | (2-1) | 10% |
| 3-HB-O2 | (2-8) | 10% |

NI = 72.8° C.; $T_c$ < −20° C.; $\Delta n$ = 0.087; $\eta$ = 26.7 mPa · s; $\Delta\epsilon$ = −4.7; VHR − 1 = 99.2%.

Example 7

| | | |
|---|---|---|
| 2-HV1OB(2F,3F)-1 | (1-1-1) | 10% |
| 3-HV1OB(2F,3F)-O1 | (1-1-2) | 7% |
| 3-HV1OB(2F,3F)-O2 | (1-1-2) | 7% |
| 3-HHV1OB(2F,3F)-1 | (1-2-1) | 12% |
| 3-HHV1OB(2F,3F)-O1 | (1-2-2) | 9% |
| 3-HHV1OB(2F,3F)-O2 | (1-2-2) | 9% |
| 3-HH-4 | (2-1) | 10% |
| 3-HH-5 | (2-1) | 5% |
| 3-HB-O2 | (2-8) | 7% |
| 5-HB-O2 | (2-8) | 15% |
| 1O1-HBBH-4 | (4-3) | 3% |
| 1O1-HBBH-5 | (4-3) | 3% |
| 5HBB(F)B-2 | (4-5) | 3% |

NI = 70.9° C.; $T_c$ < −20° C.; $\Delta n$ = 0.092; $\eta$ = 24.0 mPa · s; $\Delta\epsilon$ = −2.6; VHR − 1 = 99.0%.

Example 8

| | | |
|---|---|---|
| 3-HV1OB(2F,3F)-2 | (1-1-1) | 8% |
| 3-HV1OB(2F,3F)-O2 | (1-1-2) | 8% |
| 2-HHV1OB(2F,3F)-2 | (1-2-1) | 9% |
| 3-HHV1OB(2F,3F)-O1 | (1-2-2) | 11% |
| 3-HHV1OB(2F,3F)-O2 | (1-2-2) | 9% |
| 2-HH-5 | (2-1) | 6% |
| 3-HH-4 | (2-1) | 11% |
| 7-HB-1 | (2-7) | 3% |
| 3-HB-O2 | (2-8) | 8% |
| 5-HB-O2 | (2-8) | 4% |
| 3-HHB-1 | (3-3) | 6% |
| 3-HHB-O1 | (3-4) | 3% |
| 3-HHEBH-3 | (4-1) | 3% |
| 1O1-HBBH-5 | (4-3) | 4% |
| 5HBB(F)B-2 | (4-5) | 3% |
| 5HBB(F)B-3 | (4-5) | 4% |

NI = 97.2° C.; $T_c$ < −20° C.; $\Delta n$ = 0.118; $\eta$ = 25.5 mPa · s; $\Delta\epsilon$ = −2.5; VHR − 1 = 99.1%.

Example 9

| | | |
|---|---|---|
| 2-HV1OB(2F,3F)-O2 | (1-1-2) | 5% |
| 3-HV1OB(2F,3F)-O1 | (1-1-2) | 5% |
| 3-HV1OB(2F,3F)-O2 | (1-1-2) | 5% |
| 2-HHV1OB(2F,3F)-1 | (1-2-1) | 8% |
| 3-HHV1OB(2F,3F)-1 | (1-2-1) | 7% |
| 2-HHV1OB(2F,3F)-O2 | (1-2-2) | 10% |
| 3-HHV1OB(2F,3F)-O1 | (1-2-2) | 10% |
| 3-HHV1OB(2F,3F)-O2 | (1-2-2) | 11% |
| 5-HHV1OB(2F,3F)-O2 | (1-2-2) | 11% |
| 3-HH-4 | (2-1) | 12% |
| 3-HH-5 | (2-1) | 7% |
| 7-HB-1 | (2-7) | 4% |
| 3-HB-O2 | (2-8) | 5% |

NI = 81.8° C.; $T_c$ < −20° C.; $\Delta n$ = 0.090; $\eta$ = 29.3 mPa · s; $\Delta\epsilon$ = −4.9; VHR − 1 = 99.0%.

Example 10

| | | |
|---|---|---|
| 2-HV1OB(2F,3F)-O2 | (1-1-2) | 6% |
| 3-HV1OB(2F,3F)-O2 | (1-1-2) | 8% |
| 3-HHV1OB(2F,3F)-1 | (1-2-1) | 6% |
| 2-HHV1OB(2F,3F)-O2 | (1-2-2) | 7% |
| 3-HHV1OB(2F,3F)-O1 | (1-2-2) | 7% |
| 3-HHV1OB(2F,3F)-O2 | (1-2-2) | 13% |
| 5-HHV1OB(2F,3F)-O2 | (1-2-2) | 13% |
| 2-HH-5 | (2-1) | 5% |
| 3-HH-4 | (2-1) | 10% |
| 3-HH-5 | (2-1) | 5% |
| 3-HB-O2 | (2-8) | 9% |
| 3-HHEBH-3 | (4-1) | 4% |
| 1O1-HBBH-5 | (4-3) | 4% |
| 5HBB(F)B-2 | (4-5) | 3% |

NI = 101.2° C.; $T_c$ < −20° C.; $\Delta n$ = 0.100; $\eta$ = 29.8 mPa · s; $\Delta\epsilon$ = −4.2; VHR − 1 = 99.1%.

Example 11

| | | |
|---|---|---|
| 3-HV1OB(2F,3F)-O1 | (1-1-2) | 6% |
| 3-HV1OB(2F,3F)-O2 | (1-1-2) | 12% |
| 2-HHV1OB(2F,3F)-1 | (1-2-1) | 9% |
| 2-HHV1OB(2F,3F)-O2 | (1-2-2) | 5% |
| 3-HHV1OB(2F,3F)-O1 | (1-2-2) | 8% |
| 3-HHV1OB(2F,3F)-O2 | (1-2-2) | 12% |
| 2-HH-5 | (2-1) | 5% |
| 3-HH-4 | (2-1) | 14% |
| 3-HB-O2 | (2-8) | 13% |
| 3-HHB-1 | (3-3) | 7% |
| 3-HHB-3 | (3-3) | 3% |
| 1O1-HBBH-5 | (4-3) | 3% |
| 5HBB(F)B-2 | (4-5) | 3% |

NI = 85.7° C.; $T_c$ < −20° C.; $\Delta n$ = 0.094; $\eta$ = 24.7 mPa · s; $\Delta\epsilon$ = −3.6; VHR − 1 = 99.2%.

Example 12

| | | |
|---|---|---|
| 3-HV1OB(2F,3F)-1 | (1-1-1) | 6% |
| 3-HV1OB(2F,3F)-2 | (1-1-1) | 5% |
| 3-HV1OB(2F,3F)-O2 | (1-1-2) | 8% |
| 2-HHV1OB(2F,3F)-1 | (1-2-1) | 7% |
| 3-HHV1OB(2F,3F)-2 | (1-2-1) | 7% |
| 3-HHV1OB(2F,3F)-O1 | (1-2-2) | 9% |
| 5-HHV1OB(2F,3F)-O2 | (1-2-2) | 11% |
| 3-HH-4 | (2-1) | 12% |
| 3-HB-O2 | (2-8) | 10% |
| 5-HB-O2 | (2-8) | 10% |
| 3-HHB-1 | (3-3) | 5% |
| 3-HHB-3 | (3-3) | 7% |
| 3-HHB-O1 | (3-4) | 3% |

NI = 75.4° C.; $T_c$ < −20° C.; $\Delta n$ = 0.087; $\eta$ = 21.7 mPa · s; $\Delta\epsilon$ = −2.6; VHR − 1 = 99.1%.

Example 13

| | | |
|---|---|---|
| 3-HV1OB(2F,3F)-1 | (1-1-1) | 7% |
| 3-HV1OB(2F,3F)-O1 | (1-1-2) | 7% |
| 3-HHV1OB(2F,3F)-1 | (1-2-1) | 14% |
| 2-HHV1OB(2F,3F)-O2 | (1-2-2) | 8% |
| 3-HHV1OB(2F,3F)-O1 | (1-2-2) | 11% |
| 2-HH-5 | (2-1) | 6% |
| 3-HH-4 | (2-1) | 11% |
| 7-HB-1 | (2-7) | 5% |
| 3-HB-O2 | (2-8) | 8% |
| 3-HHB-1 | (3-3) | 4% |
| 3-HHB-O1 | (3-4) | 3% |
| 3-HHEBH-3 | (4-1) | 2% |
| 1O1-HBBH-5 | (4-3) | 3% |
| 5HBB(F)B-3 | (4-5) | 5% |
| 5-HB-CL | (5-2) | 3% |
| 3-HHB-CL | (5-5) | 3% |

NI = 90.8° C.; $T_c$ < −20° C.; $\Delta n$ = 0.096; $\eta$ = 24.9 mPa · s; $\Delta\epsilon$ = −2.6; VHR − 1 = 99.1%.

Example 14

| | | |
|---|---|---|
| 2-HV1OB(2F,3F)-O2 | (1-1-2) | 7% |
| 3-HV1OB(2F,3F)-O1 | (1-1-2) | 7% |
| 2-HHV1OB(2F,3F)-1 | (1-2-1) | 10% |
| 3-HHV1OB(2F,3F)-2 | (1-2-1) | 10% |
| 2-HHV1OB(2F,3F)-O2 | (1-2-2) | 10% |
| 3-HHV1OB(2F,3F)-O2 | (1-2-2) | 12% |
| 2-HH-5 | (2-1) | 13% |
| 3-HH-4 | (2-1) | 10% |
| 3-HH-5 | (2-1) | 4% |
| 3-HB-O2 | (2-8) | 10% |
| 3-HHB-1 | (3-3) | 5% |
| 2-BB-5 | (-) | 2% |

NI = 70.5° C.; $T_c$ < −20° C.; $\Delta n$ = 0.080; $\eta$ = 21.5 mPa · s; $\Delta\epsilon$ = −3.9; VHR − 1 = 99.2%.

Example 15

| | | |
|---|---|---|
| 2-HV1OB(2F,3F)-1 | (1-1-1) | 5% |
| 3-HV1OB(2F,3F)-O2 | (1-1-2) | 9% |
| 3-HHV1OB(2F,3F)-1 | (1-2-1) | 8% |
| 3-HHV1OB(2F,3F)-2 | (1-2-1) | 8% |
| 3-HHV1OB(2F,3F)-O2 | (1-2-2) | 8% |
| 5-HHV1OB(2F,3F)-O2 | (1-2-2) | 8% |
| 2-HH-5 | (2-1) | 7% |
| 3-HH-4 | (2-1) | 11% |
| 7-HB-1 | (2-7) | 4% |
| 3-HB-O2 | (2-8) | 8% |
| 3-HHB-1 | (3-3) | 4% |
| 3-HHB-O1 | (3-4) | 4% |
| 3-HHEBH-5 | (4-1) | 2% |
| 1O1-HBBH-5 | (4-3) | 3% |
| 5HBB(F)B-2 | (4-5) | 3% |
| 5-HB-CL | (5-2) | 3% |
| 5-HHB-CL | (5-5) | 3% |
| 2-BB-4 | (-) | 2% |

NI = 88.4° C.; $T_c$ < −20° C.; $\Delta n$ = 0.094; $\eta$ = 21.8 mPa · s; $\Delta\epsilon$ = −2.5; VHR − 1 = 99.0%.

Example 16

| | | |
|---|---|---|
| 2-HV1OB(2F,3F)-O2 | (1-1-2) | 7% |
| 3-HV1OB(2F,3F)-O2 | (1-1-2) | 7% |
| 3-HHV1OB(2F,3F)-1 | (1-2-1) | 9% |
| 5-HHV1OB(2F,3F)-1 | (1-2-1) | 9% |
| 2-HHV1OB(2F,3F)-O2 | (1-2-2) | 11% |
| 3-HHV1OB(2F,3F)-O2 | (1-2-2) | 11% |
| 2-HH-5 | (2-1) | 10% |
| 3-HH-4 | (2-1) | 14% |
| 5-HH-V | (2-1) | 2% |
| 3-HH-O3 | (2-2) | 2% |
| 3-HB-O2 | (2-8) | 10% |
| 3-HHEH-5 | (3-2) | 2% |
| 3-HHB-1 | (3-3) | 4% |
| V-HHB-1 | (3-3) | 2% |

NI = 76.6° C.; $T_c$ < −20° C.; $\Delta n$ = 0.080; $\eta$ = 21.7 mPa · s; $\Delta\epsilon$ = −3.8; VHR − 1 = 99.1%.

Example 17

| | | |
|---|---|---|
| V-HV1OB(2F,3F)-O2 | (1-1-2) | 9% |
| 3-HV1OB(2F,3F)-O1 | (1-1-2) | 8% |
| 2-HHV1OB(2F,3F)-O2 | (1-2-2) | 10% |
| 3-HHV1OB(2F,3F)-O1 | (1-2-2) | 10% |
| 3-HHV1OB(2F,3F)-O2 | (1-2-2) | 11% |
| 5-HHV1OB(2F,3F)-O2 | (1-2-2) | 11% |
| 2-HH-5 | (2-1) | 10% |
| 3-HH-4 | (2-1) | 15% |
| 7-HB-1 | (2-7) | 5% |
| 3-HHB-3 | (3-3) | 11% |

NI = 80.9° C.; $T_c$ < −20° C.; $\Delta n$ = 0.086; $\eta$ = 24.8 mPa · s; $\Delta\epsilon$ = −4.2; VHR − 1 = 99.1%.

Example 18

| | | |
|---|---|---|
| 3-HV1OB(2F,3F)-1 | (1-1-1) | 8% |
| 3-HV1OB(2F,3F)-O1 | (1-1-2) | 9% |
| 3-HHV1OB(2F,3F)-2 | (1-2-1) | 9% |
| 3-HHV1OB(2F,3F)-O2 | (1-2-2) | 15% |
| 3-HV1OB(2F,3F)B(2F)-1 | (1-3-3) | 5% |
| 3-HV1OB(2F,3F)B(2F)-O2 | (1-3-4) | 5% |
| 2-HH-5 | (2-1) | 4% |
| 5-HH-V | (2-1) | 10% |
| 3-HH-2V | (2-1) | 5% |
| 3-HH-O1 | (2-2) | 6% |
| 3-HB-O1 | (2-8) | 5% |
| 3-HHEH-3 | (3-2) | 3% |
| 3-HHB-1 | (3-3) | 3% |
| V-HHB-1 | (3-3) | 4% |
| 3-HHEBH-3 | (4-1) | 3% |
| 5-HBBH-3 | (4-2) | 3% |
| 5-HB(F)BH-3 | (4-4) | 3% |

NI = 75.8° C.; $T_c$ < −20° C.; $\Delta n$ = 0.086; $\eta$ = 29.4 mPa · s; $\Delta\epsilon$ = −3.3; VHR − 1 = 99.0%.

Example 19

| | | |
|---|---|---|
| 3-HV1OB(2F,3F)-1 | (1-1-1) | 8% |
| 3-HV1OB(2F,3F)-O1 | (1-1-2) | 9% |
| 3-HHV1OB(2F,3F)-2 | (1-2-1) | 9% |
| 3-HHV1OB(2F,3F)-O2 | (1-2-2) | 15% |
| V-HV1OB(2F,3F)B(2F)-O2 | (1-3-4) | 10% |
| 2-HH-5 | (2-1) | 4% |
| 5-HH-V | (2-1) | 10% |
| 3-HH-2V | (2-1) | 5% |
| 3-HH-O1 | (2-2) | 6% |
| 3-HB-O1 | (2-8) | 5% |
| 3-HHEH-3 | (3-2) | 3% |
| 3-HHB-3 | (3-3) | 3% |

-continued

| | | |
|---|---|---|
| V-HHB-1 | (3-3) | 4% |
| 3-HHEBH-3 | (4-1) | 3% |
| 5-HBBH-3 | (4-2) | 3% |
| 5-HB(F)BH-3 | (4-4) | 3% |

NI = 77.0° C.; $T_c$ < −20° C.; $\Delta n$ = 0.088; $\eta$ = 28.9 mPa · s; $\Delta\epsilon$ = −3.3; VHR − 1 = 98.8%.

Example 20

| | | |
|---|---|---|
| 2-HV1OB(2F,3F)-O2 | (1-1-2) | 7% |
| 3-HV1OB(2F,3F)-O2 | (1-1-2) | 7% |
| 3-HHV1OB(2F,3F)-1 | (1-2-1) | 9% |
| 5-HHV1OB(2F,3F)-1 | (1-2-1) | 9% |
| 2-HV1OB(2F,3F)B(F)-1 | (1-3-5) | 6% |
| 3-HV1OB(2F,3F)B(F)-1 | (1-3-5) | 6% |
| V-HV1OB(2F,3F)B(F)-O2 | (1-3-6) | 5% |
| 3-HV1OB(2F,3F)B(F)-O2 | (1-3-6) | 5% |
| 2-HH-5 | (2-1) | 10% |
| 3-HH-4 | (2-1) | 14% |
| 5-HH-V | (2-1) | 2% |
| 3-HH-O3 | (2-2) | 2% |
| 3-HB-O2 | (2-8) | 12% |
| 3-HHEH-5 | (3-2) | 2% |
| 3-HHEB-F | (5-6) | 4% |

NI = 76.4° C.; $T_c$ < −20° C.; $\Delta n$ = 0.079; $\eta$ = 24.2 mPa · s; $\Delta\epsilon$ = −3.8; VHR − 1 = 99.2%.

Example 21

| | | |
|---|---|---|
| 2-HV1OB(2F,3F)-1 | (1-1-1) | 4% |
| 3-HV1OB(2F,3F)-1 | (1-1-1) | 6% |
| 3-HV1OB(2F,3F)-2 | (1-1-1) | 10% |
| 2-HHV1OB(2F,3F)-1 | (1-2-1) | 9% |
| 3-HHV1OB(2F,3F)-1 | (1-2-1) | 9% |
| V-HHV1OB(2F,3F)-1 | (1-2-1) | 14% |
| 3-HV1OBB(2F,3F)-1 | (1-4-1) | 7% |
| 3-HV1OBB(2F,3F)-O2 | (1-4-2) | 6% |
| 3-HH-4 | (2-1) | 12% |
| 5-HH-VFF | (2-4) | 2% |
| 3-HEH-3 | (2-6) | 2% |
| 3-HB-O2 | (2-8) | 7% |
| 3-HH1OH-3 | (3-1) | 2% |
| 3-HHB-1 | (3-3) | 6% |
| 3-HHB-O1 | (3-4) | 2% |
| VFF-HHB-1 | (3-5) | 2% |

NI = 75.7° C.; $T_c$ < −20° C.; $\Delta n$ = 0.092; $\eta$ = 28.9 mPa · s; $\Delta\epsilon$ = −2.9; VHR − 1 = 99.0%.

Example 22

| | | |
|---|---|---|
| 2-HV1OB(2F,3F)-1 | (1-1-1) | 5% |
| 2-HV1OB(2F,3F)-O2 | (1-1-2) | 6% |
| 3-HV1OB(2F,3F)-O2 | (1-1-2) | 6% |
| 2-HHV1OB(2F,3F)-O2 | (1-2-2) | 11% |
| 3-HHV1OB(2F,3F)-O2 | (1-2-2) | 12% |
| 5-HHV1OB(2F,3F)-O2 | (1-2-2) | 12% |
| 2-HV1OB(2F)B(2F,3F)-1 | (1-4-3) | 9% |
| 3-HV1OB(2F)B(2F,3F)-1 | (1-4-3) | 9% |
| 3-HH-4 | (2-1) | 10% |
| 3-HH-V | (2-1) | 20% |

NI = 71.8° C.; $T_c$ < −20° C.; $\Delta n$ = 0.094; $\eta$ = 33.5 mPa · s; $\Delta\epsilon$ = −4.4; VHR − 1 = 99.2%.

Example 23

| | | |
|---|---|---|
| 2-HV1OB(2F,3F)-O2 | (1-1-2) | 5% |
| 3-HV1OB(2F,3F)-O1 | (1-1-2) | 5% |
| 3-HV1OB(2F,3F)-O2 | (1-1-2) | 5% |
| 2-HHV1OB(2F,3F)-1 | (1-2-1) | 8% |
| 3-HHV1OB(2F,3F)-1 | (1-2-1) | 7% |
| 2-HHV1OB(2F,3F)-O2 | (1-2-2) | 10% |
| 3-HHV1OB(2F,3F)-O1 | (1-2-2) | 10% |
| 3-HV1OB(2F)B(2F,3F)-O2 | (1-4-4) | 7% |
| 5-HV1OB(2F)B(2F,3F)-O2 | (1-4-4) | 7% |
| V-HV1OB(2F)B(2F,3F)-O2 | (1-4-4) | 8% |
| 3-HH-4 | (2-1) | 12% |
| 3-HH-5 | (2-1) | 7% |
| 3-HH-V | (2-1) | 5% |
| 7-HB-1 | (2-7) | 4% |

NI = 77.8° C.; $T_c$ < −20° C.; $\Delta n$ = 0.091; $\eta$ = 35.0 mPa · s; $\Delta\epsilon$ = −4.7; VHR − 1 = 99.1%.

Example 24

| | | |
|---|---|---|
| 2-HV1OB(2F,3F)-O2 | (1-1-2) | 7% |
| 3-HV1OB(2F,3F)-O2 | (1-1-2) | 7% |
| 3-HHV1OB(2F,3F)-1 | (1-2-1) | 9% |
| 2-HHV1OB(2F,3F)-O2 | (1-2-2) | 11% |
| 3-HHV1OB(2F,3F)-O2 | (1-2-2) | 10% |
| 3-HV1OB(F)B(2F,3F)-O2 | (1-4-6) | 5% |
| V-HV1OB(F)B(2F,3F)-O2 | (1-4-6) | 5% |
| 2-HH-5 | (2-1) | 14% |
| 3-HH-4 | (2-1) | 14% |
| 3-HB-O2 | (2-8) | 10% |
| 5-HB-O2 | (2-8) | 6% |
| 3-HHB-1 | (3-3) | 2% |

NI = 70.1° C.; $T_c$ < −20° C.; $\Delta n$ = 0.086; $\eta$ = 22.8 mPa · s; $\Delta\epsilon$ = −4.0; VHR − 1 = 99.1%.

Example 25

| | | |
|---|---|---|
| 2-HV1OB(2F,3F)-O2 | (1-1-2) | 6% |
| 3-HV1OB(2F,3F)-O2 | (1-1-2) | 8% |
| 2-HHV1OB(2F,3F)-O2 | (1-2-2) | 7% |
| 3-HHV1OB(2F,3F)-O1 | (1-2-2) | 7% |
| 3-HHV1OB(2F,3F)-O2 | (1-2-2) | 13% |
| 3-HV1OB(2F,3F)B(2F,3F)-O2 | (1-4-8) | 7% |
| 5-HV1OB(2F,3F)B(2F,3F)-O2 | (1-4-8) | 6% |
| 2-HH-5 | (2-1) | 5% |
| 3-HH-4 | (2-1) | 10% |
| 3-HH-5 | (2-1) | 5% |
| 3-HB-O2 | (2-8) | 9% |
| 3-HHB-1 | (3-3) | 6% |
| 3-HHEBH-3 | (4-1) | 4% |
| 1O1-HBBH-5 | (4-3) | 4% |
| 5HBB(F)B-2 | (4-5) | 3% |

NI = 98.4° C.; $T_c$ < −20° C.; $\Delta n$ = 0.106; $\eta$ = 33.5 mPa · s; $\Delta\epsilon$ = −4.1; VHR − 1 = 99.2%.

Example 26

| | | |
|---|---|---|
| 2-HV1OB(2F,3F)-O2 | (1-1-2) | 6% |
| 3-HV1OB(2F,3F)-O2 | (1-1-2) | 8% |
| 2-HHV1OB(2F,3F)-O2 | (1-2-2) | 7% |
| 3-HHV1OB(2F,3F)-O2 | (1-2-2) | 13% |
| 3-HV1OB(2F,3F)B(2F,3F)-O2 | (1-4-8) | 7% |
| 5-HV1OB(2F,3F)B(2F,3F)-O2 | (1-4-8) | 6% |
| V-HV1OB(2F,3F)B(2F,3F)-O2 | (1-4-8) | 7% |
| 2-HH-5 | (2-1) | 5% |

-continued

| 3-HH-4 | (2-1) | 10% |
| 3-HH-5 | (2-1) | 5% |
| 3-HB-O2 | (2-8) | 9% |
| 3-HHB-1 | (3-3) | 6% |
| 3-HHEBH-3 | (4-1) | 4% |
| 1O1-HBBH-5 | (4-3) | 4% |
| 5HBB(F)B-2 | (4-5) | 3% |

NI = 96.9° C.; $T_c$ < −20° C.; $\Delta n$ = 0.110; $\eta$ = 35.5 mPa · s; $\Delta\epsilon$ = −4.2; VHR − 1 = 99.2%.

Example 27

An antioxidant and a UV ray absorber were added to the liquid crystal composition prepared in Example 26. These additives are 0.01% of 3,5-di-t-butyl-4-hydroxytoluene and 0.01% of 2-(2-hydroxy-5-methylphenyl)benzotriazole each based on the total weight of the composition. The composition thus obtained had the following characteristics.

What is claimed is:

1. A liquid crystal composition having a negative dielectric anisotropy, which comprises at least one compound selected from the group of compounds represented by Formulas (1-3) and (1-4) as a first component:

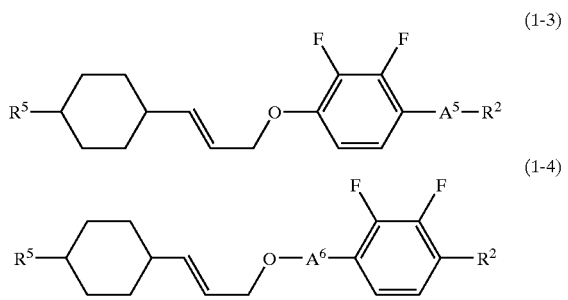

wherein $R^5$ is alkyl or alkenyl; $R^2$ is alkyl or alkoxy; $A^5$ is 1,4-phenylene or 2-fluoro-1,4-phenylene and $A^6$ is 1,4-phenylene, 2-fluoro-1,4-phenylene or 2,3-difluoro-1,4-phenylene.

2. The liquid crystal composition according to claim 1, wherein in Formulas (1-3) and (1-4), $R^5$ is alkyl, and $A^5$ and $A^6$ are 1,4-phenylene.

3. The liquid crystal composition according to claim 1, wherein the first component is in the range from 30% to 80% by weight, wherein the range is based on the total weight of the liquid crystal composition.

4. The liquid crystal composition according to claim 1, which further comprises at least one compound selected from the group of compounds represented by Formulas (2), (3) and (4) as a second component:

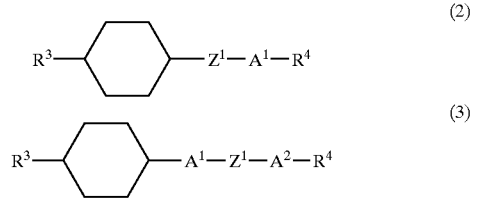

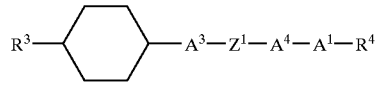

wherein $R^3$ and $R^4$ are independently alkyl, alkoxy, alkoxymethyl, —COO—$R^1$, alkenyl or alkenyl in which any hydrogen is replaced by fluorine; $R^1$ is alkyl; $A^1$ and $A^2$ are independently 1,4-cyclohexylene or 1,4-phenylene; $A^3$ and $A^4$ are independently 1,4-cyclohexylene, 1,4-phenylene or 2-fluoro-1,4-phenylene; and $Z^1$ is a single bond, —(CH$_2$)$_2$—, —COO— or —CH$_2$O—.

5. The liquid crystal composition according to claim 4, wherein the second component is in the range from 20% to 70% by weight, wherein the range is based on the total weight of the liquid crystal composition.

6. A liquid crystal composition having a negative dielectric anisotropy, which comprises at least one compound selected from the group of compounds represented by Formulas (1-1), (1-2), (1-3) and (1-4) as a first component, at least one compound selected from the group of compounds represented by Formulas (2), (3) and (4) as a second component, and at least one compound selected from the group of compounds represented by Formula (5) as a third component:

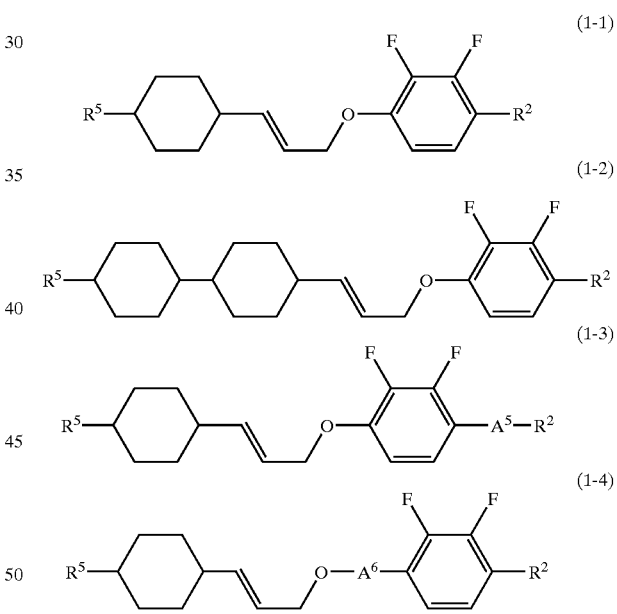

wherein $R^5$ is alkyl or alkenyl; $R^2$ is alkyl or alkoxy;

$A^5$ is 1,4-phenylene or 2-fluoro-1,4-phenylene; and $A^6$ is 1,4-phenylene, 2-fluoro-1,4-phenylene or 2,3-difluoro-1,4-phenylene,

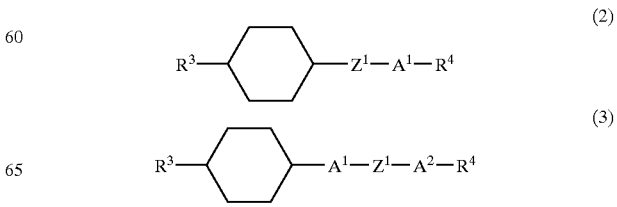

-continued

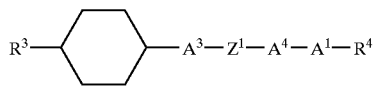
(4)

wherein R³ and R⁴ are independently alkyl, alkoxy, alkoxymethyl, —COO—R¹, alkenyl or alkenyl in which any hydrogen is replaced by fluorine;
R¹ is alkyl; A¹ and A² are independently 1,4-cyclohexylene or 1,4-phenylene;
A³ and A⁴ are indenendently 1,4-cyclohexylene, 1,4-phenylene or 2-fluoro-1,4-phenylene; and Z¹ is a single bond, —(CH₂)₂—, —COO— or —CH₂O—,

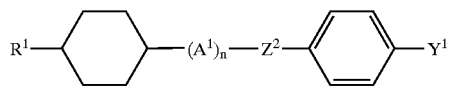
(5)

wherein R¹ is alkyl; A¹ is 1,4-cyclohexylene or 1,4-phenylene; Z² is a single bond or —COO—; Y¹ is fluorine or chlorine; and n is 0 or 1.

7. The liquid crystal composition according to claim 6, wherein the first component is in the range from 30% to 80% by weight, the second component is in the range from 20% to 70% by weight, and the third component is in the range from 3% to 20% by weight, wherein the ranges are based on the total weight of the liquid crystal composition.

8. A liquid crystal display element comprising the liquid crystal composition according to claim 1.

9. A liquid crystal display element comprising the liquid crystal composition according to claim 2.

10. A liquid crystal display element comprising the liquid crystal composition according to claim 3.

11. A liquid crystal display element comprising the liquid crystal composition according to claim 4.

12. A liquid crystal display element comprising the liquid crystal composition according to claim 5.

13. A liquid crystal display element comprising the liquid crystal composition according to claim 6.

14. A liquid crystal display element comprising the liquid composition according to claim 7.

15. The liquid crystal composition according to claim 3, which further comprises at least one compound selected from the group of compounds represented by Formulas (2), (3) and (4) as a second component:

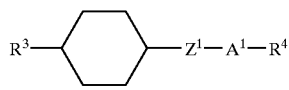
(2)

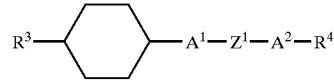
(3)

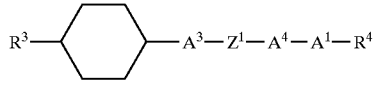
(4)

wherein R³ and R⁴ are independently alkyl, alkoxy, alkoxymethyl, —COO—R¹, alkenyl or alkenyl in which any hydrogen is replaced by fluorine; R¹ is alkyl; A¹ and A² are independently 1,4-cyclohexylene or 1,4-phenylene; A³ and A⁴ are independently 1,4-cyclohexylene, 1,4-phenylene or 2-fluoro-1,4-phenylene; and Z¹ is a single bond, —(CH₂)₂—, —COO— or —CH₂O—.

16. The liquid crystal composition according to claim 15, wherein the second component is in the range from 20% to 70% by weight, wherein the range is based on the total weight of the liquid crystal composition.

17. A liquid crystal composition having a negative dielectric anisotropy, which comprises at least one compound selected from the group of compounds represented by Formula (1-1), and at least one compound selected from the group of compounds represented by Formula (1-2) as a first component, and at least one compound selected from the group of compounds represented by Formula (2) as a second component:

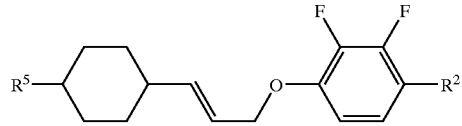
(1-1)

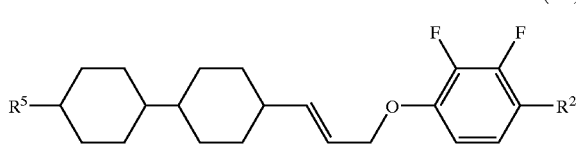
(1-2)

wherein R⁵ is alkyl or alkenyl; and R² is alkyl or alkoxy,

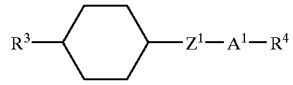
(2)

wherein R³ and R⁴ are independently alkyl, alkoxy, alkoxymethyl, —COO—R¹, alkenyl or alkenyl in which any hydrogen is replaced by fluorine; R¹ is alkyl; A¹ is 1,4-cyclohexylene or 1,4-phenylene; and Z¹ is a single bond, —(CH₂)₂—, —COO— or —CH₂O—.

18. The liquid crystal composition according to claim 17, wherein the first component is in the range from 30% to 80% by weight, and the second component is in the range from 20% to 70% by weight, wherein the ranges are based on the total weight of the liquid crystal composition.

19. A liquid crystal composition having a negative dielectric anisotropy, which comprises at least one compound selected from the group of compounds represented by Formula (1-1), and at least one compound selected from the group of compounds represented by Formula (1-2) as a first component, and at least one compound selected from the group of compounds represented by Formula (2), and at least one compound selected from the group of compounds represented by Formula (3) as a second component:

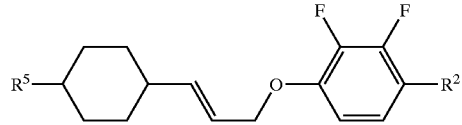
(1-1)

-continued (1-2)
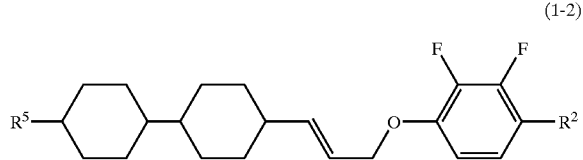

wherein $R^5$ is alkyl or alkenyl; and $R^2$ is alkyl or alkoxy, (2)
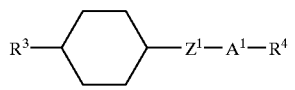

(3)
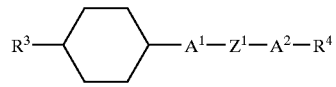

wherein $R^3$ and $R^4$ are independently alkyl, alkoxy, alkoxymethyl, —COO—$R^1$, alkenyl or alkenyl in which any hydrogen is replaced by fluorine; $R^1$ is alkyl; $A^1$ and $A^2$ are independently 1,4-cyclohexylene or 1,4-phenylene; and $Z^1$ is a single bond, —(CH$_2$)$_2$—, —COO— or —CH$_2$O—.

20. The liquid crystal composition according to claim 19, wherein the first component is in the range from 30% to 80% by weight, and the second component is in the range from 20% to 70% by weight, wherein the ranges are based on the total weight of the liquid crystal composition.

21. A liquid crystal display element comprising the liquid crystal composition according to claim 15.

22. A liquid crystal display element comprising the liquid crystal composition according to claim 16.

23. A liquid crystal display element comprising the liquid crystal composition according to claim 17.

24. A liquid crystal display element comprising the liquid crystal composition according to claim 18.

25. A liquid crystal display element comprising the liquid crystal composition according to claim 19.

26. A liquid crystal display element comprising the liquid crystal composition according to claim 20.

* * * * *